US011531354B2

(12) United States Patent
Tsurumi

(10) Patent No.: US 11,531,354 B2
(45) Date of Patent: Dec. 20, 2022

(54) IMAGE PROCESSING APPARATUS AND IMAGE PROCESSING METHOD

(71) Applicant: SONY CORPORATION, Tokyo (JP)

(72) Inventor: Shingo Tsurumi, Saitama (JP)

(73) Assignee: SONY CORPORATION, Tokyo (JP)

( * ) Notice: Subject to any disclaimer, the term of this patent is extended or adjusted under 35 U.S.C. 154(b) by 96 days.

(21) Appl. No.: 16/767,432

(22) PCT Filed: Nov. 21, 2018

(86) PCT No.: PCT/JP2018/042922
§ 371 (c)(1),
(2) Date: May 27, 2020

(87) PCT Pub. No.: WO2019/111702
PCT Pub. Date: Jun. 13, 2019

(65) Prior Publication Data
US 2020/0409387 A1 Dec. 31, 2020

(30) Foreign Application Priority Data

Dec. 5, 2017 (JP) .............................. JP2017-233095

(51) Int. Cl.
G05D 1/02 (2020.01)
(52) U.S. Cl.
CPC ......... G05D 1/0274 (2013.01); G05D 1/0219 (2013.01); G05D 1/0238 (2013.01); G05D 1/0246 (2013.01); G05D 2201/0213 (2013.01)

(58) Field of Classification Search
CPC .. G05D 1/0274; G05D 1/0219; G05D 1/0238; G05D 1/0246; G05D 2201/0213
See application file for complete search history.

(56) References Cited

U.S. PATENT DOCUMENTS

| 9,424,649 | B1* | 8/2016 | Tanaka .................. G06V 20/56 |
| 2009/0024251 | A1 | 1/2009 | Myeong et al. |
| 2015/0057871 | A1 | 2/2015 | Ono et al. |
| 2015/0355639 | A1 | 12/2015 | Versteeg et al. |

(Continued)

FOREIGN PATENT DOCUMENTS

| CA | 2869374 A1 | 10/2013 |
| JP | 2011-008320 A | 1/2011 |
| JP | 2011-198098 A | 10/2011 |

(Continued)

OTHER PUBLICATIONS

English Translation of JP2011248445A.*

(Continued)

Primary Examiner — Rami Khatib
Assistant Examiner — Shahira Baajour
(74) Attorney, Agent, or Firm — Chip Law Group

(57) ABSTRACT

Provided is a map generation unit that generates an attribute-attached occupancy grid map including an existence probability of an obstacle in a space around a moving body for each grid, and an attribute of the obstacle labelled in the occupancy grid map. A position estimation unit that estimates a position of the moving body by matching in a shape of a non-moving body and the attribute between the attribute-attached occupancy grid map and a pre-map that is the attribute-attached occupancy grid map prepared beforehand.

10 Claims, 18 Drawing Sheets

(56) References Cited

U.S. PATENT DOCUMENTS

2016/0185355 A1\* 6/2016 Yamaguchi ........ G01C 21/3602
　　　　　　　　　　　　　　　　　　　348/142
2017/0200376 A1　　7/2017 Itabashi et al.

FOREIGN PATENT DOCUMENTS

| JP | 2011-248445 A | 12/2011 |
| JP | 2017-027213 A | 2/2017 |
| JP | 2017-126101 A | 7/2017 |
| JP | 6610339 B2 \* | 11/2019 |
| KR | 10-0877071 B1 | 1/2009 |
| WO | 2013/150630 A1 | 10/2013 |

OTHER PUBLICATIONS

English Translation of JP2017027213.\*
English Translation of JP-6610339-B2.\*
International Search Report and Written Opinion of PCT Application No. PCT/JP2018/042922, dated Feb. 26, 2019, 10 pages of ISRWO.

\* cited by examiner

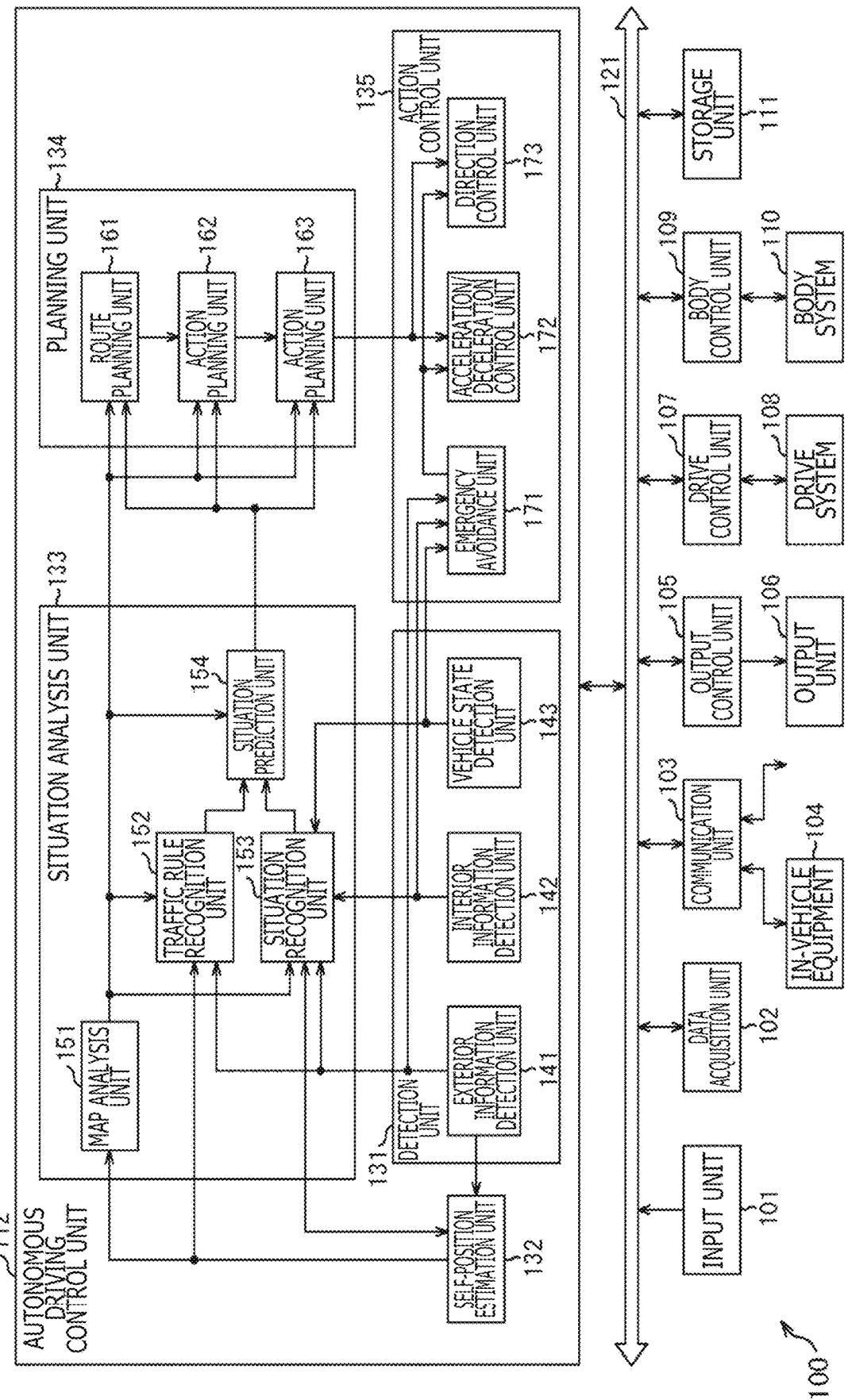

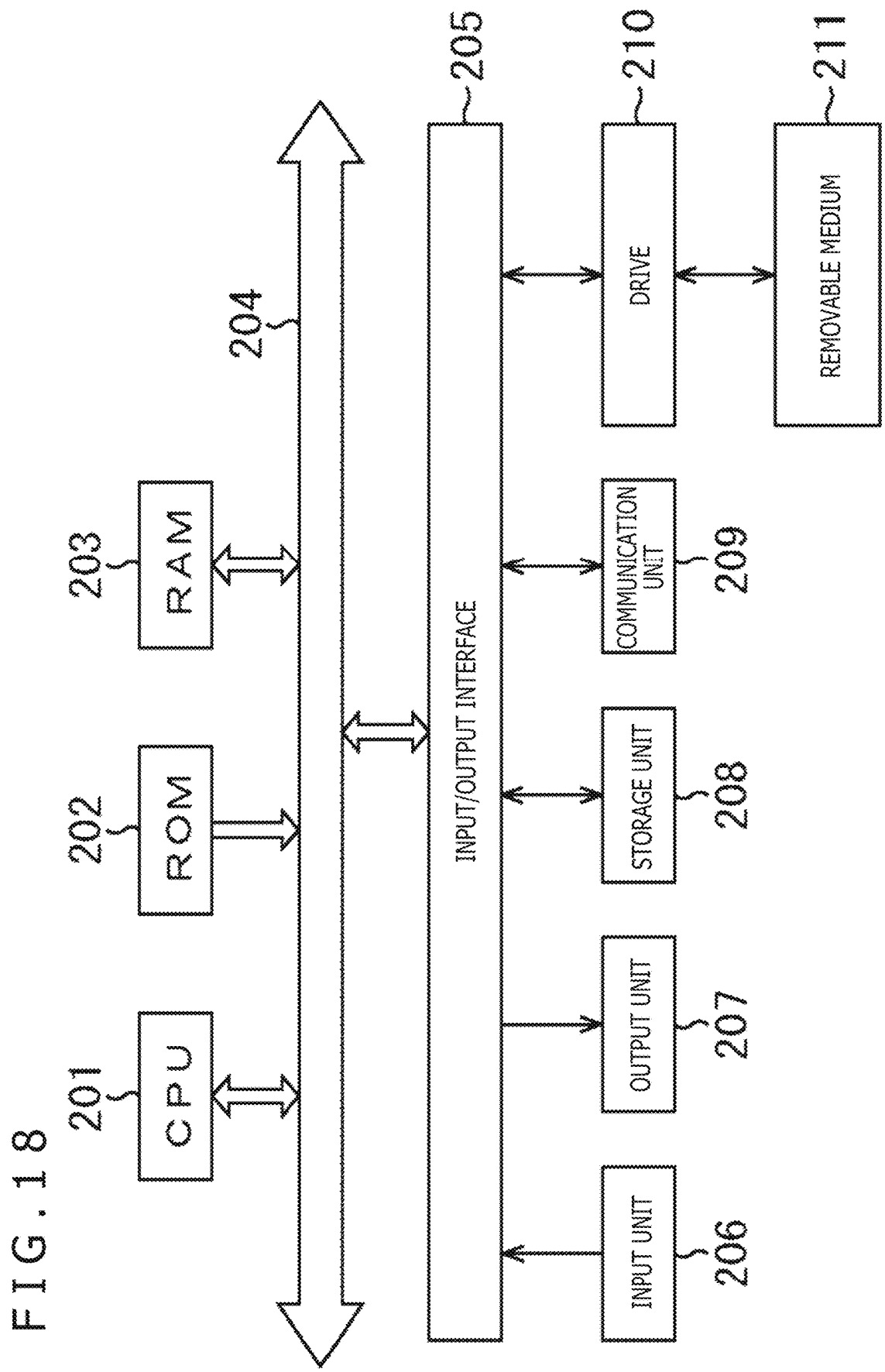

IMAGE PROCESSING APPARATUS AND IMAGE PROCESSING METHOD

CROSS REFERENCE TO RELATED APPLICATIONS

This application is a U.S. National Phase of International Patent Application No. PCT/JP2018/042922 filed on Nov. 21, 2018, which claims priority benefit of Japanese Patent Application No. JP 2017-233095 filed in the Japan Patent Office on Dec. 5, 2017. Each of the above-referenced applications is hereby incorporated herein by reference in its entirety.

TECHNICAL FIELD

The present technology relates to an information processing apparatus, an information processing method, and a program, and particularly to an information processing apparatus, an information processing method, and a program capable of obtaining an accurate self-position of a moving body.

BACKGROUND ART

Various methods for obtaining a self-position of a moving body which autonomously moves, such as a vehicle and a robot, have been proposed in recent years.

For example, PTL 1 discloses a method for estimating a self-position of a moving body using an environmental structure around the moving body, such as a flat wall surface and an obstacle having a certain height.

CITATION LIST

Patent Literature

[PTL 1]
  JP 2011-8320A

SUMMARY

Technical Problem

However, according to the method of PTL 1 which estimates a self-position of a moving body using a shape of an environmental structure, an inaccurate self-position may be estimated at a place where a similarly shaped environmental structure is present.

In consideration of the aforementioned circumstances, the present technology has been developed to obtain an accurate self-position of a moving body.

Solution to Problem

An information processing apparatus according to an aspect of the present technology includes: a map generation unit that generates an attribute-attached occupancy grid map including an existence probability of an obstacle in a space around a moving body for each grid, and an attribute of the obstacle labelled in the occupancy grid map; and a position estimation unit that estimates a position of the moving body by matching in a shape of a non-moving body and the attribute between the attribute-attached occupancy grid map and a pre-map that is the attribute-attached occupancy grid map prepared beforehand.

An information processing method according to an aspect of the present technology is an information processing method including: by an information processing apparatus, generating an attribute-attached occupancy grid map including an existence probability of an obstacle in a space around a moving body for each grid, and an attribute of the obstacle labelled in the occupancy grid map; and estimating a position of the moving body by matching in a shape of a non-moving body and the attribute between the attribute-attached occupancy grid map and a pre-map that is the attribute-attached occupancy grid map prepared beforehand.

A program according to an aspect of the present technology is a program that causes a computer to execute processes of: generating an attribute-attached occupancy grid map including an existence probability of an obstacle in a space around a moving body for each grid, and an attribute of the obstacle labelled in the occupancy grid map; and estimating a position of the moving body by matching in a shape of a non-moving body and the attribute between the attribute-attached occupancy grid map and a pre-map that is the attribute-attached occupancy grid map prepared beforehand.

According to an aspect of the present technology, an attribute-attached occupancy grid map including an existence probability of an obstacle in a space around a moving body for each grid, and an attribute of the obstacle labelled in the occupancy grid map is generated. A position of the moving body is estimated by matching in a shape of a non-moving body and the attribute between the attribute-attached occupancy grid map and a pre-map that is the attribute-attached occupancy grid map prepared beforehand.

Advantageous Effect of Invention

According to an aspect of the present technology, an accurate self-position of a moving body can be obtained.

BRIEF DESCRIPTION OF DRAWINGS

FIG. 17 is a block diagram depicting a configuration example of a moving body control system.

FIG. 18 is a block diagram depicting a configuration example of a computer.

Modes for carrying out the present disclosure (hereinafter referred to as embodiments) will be hereinafter described. Note that the description will be presented in a following order.

1. First embodiment (configuration estimating self-position)
2. Pre-map generation method
3. Second embodiment (configuration performing autonomous driving)
4. Third embodiment (configuration correcting waypoint)
5. Example of moving body control system
6. Others 1. First Embodiment Configuration Example of Vehicle Controller FIG. 1 is a block diagram depicting a configuration example of a vehicle controller according to a first embodiment to which the present technology is applied.

Figure 1:
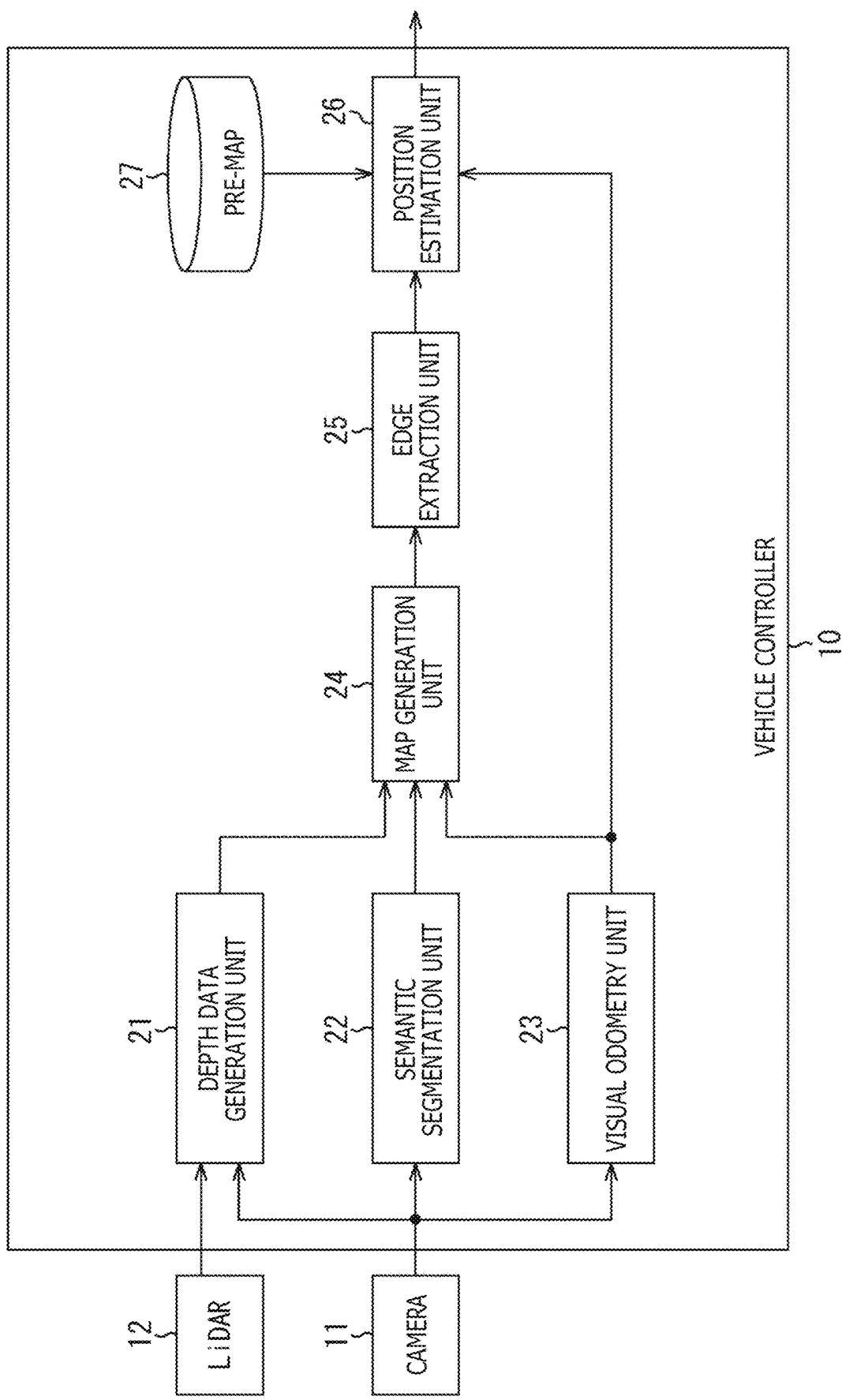
FIG. 1 is a block diagram depicting a configuration example of a vehicle controller according to a present embodiment.

A vehicle controller 10 in FIG. 1 is equipped on a vehicle such as an automobile, and constitutes a part of what is generally called an electronic control unit (ECU) or the like. The vehicle controller 10 estimates a position of the vehicle on the basis of signals from a camera 11 and a LiDAR (Light Detection and Ranging, Laser Imaging Direction and Ranging) 12 equipped on the vehicle.

The camera 11 includes a solid-state imaging element such as a CMOS (Complementary Metal Oxide Semiconductor) image sensor and a CCD (Charge Coupled Device) image sensor, and captures an image of a front of the vehicle. A captured image is output to the vehicle controller 10.

The LiDAR 12 applies laser light toward the front of the vehicle and receives reflection light reflected on an obstacle by utilizing ToF (Time of Flight) method to measure a distance to the obstacle located before the vehicle. Distance information obtained as a measurement result is output to the vehicle controller 10.

Note that the camera 11 may be constituted by a stereo camera which acquires information in a depth direction before the vehicle to output the information acquired by the camera 11 to the vehicle controller 10 as the distance information. In this case, the LiDAR 12 may be eliminated.

A detailed configuration of the vehicle controller 10 will be next described.

The vehicle controller 10 includes a depth data generation unit 21, a semantic segmentation unit 22, a visual odometry unit 23, a map generation unit 24, an edge extraction unit 25, a position estimation unit 26, and a pre-map storage unit 27.

The depth data generation unit 21 generates depth data (distance image) indicating a distance to an obstacle existing within an imaging range of the camera 11 on the basis of an image received from the camera 11 and distance information received from the LiDAR 12 (or camera 11). The generated depth data is supplied to the map generation unit 24.

The semantic segmentation unit 22 performs semantic segmentation using machine learning such as deep learning to determine an attribute of an object in units of pixel and label the attributes of respective pixels for the image received from the camera 11.

Examples of the attribute of the object include another vehicle (different vehicle), a motorcycle, a bicycle, a human (pedestrian), a structure such as a building, a roadside tree, a traffic light, and a telegraph pole existing in a space around the self-vehicle. Image data including the label of the attribute of the object is supplied to the map generation unit 24 as semantic segmentation data.

The visual odometry unit 23 detects displacement of coordinates of a feature point on an image received from the camera 11 on the basis of a difference between frames to calculate a speed, a position, and a direction of the moving self-vehicle. Motion data indicating the calculated speed, position, and direction is supplied to the map generation unit 24.

The map generation unit 24 generates an attribute-attached occupancy grid map by using respective data received from the depth data generation unit 21, the semantic segmentation unit 22, and the visual odometry unit 23, and supplies the generated map to the edge extraction unit 25. The attribute-attached occupancy grid map is data expressed in an occupancy grid map which represents an existence probability of an obstacle for each grid in a space around the self-vehicle, and including a labelled attribute of the obstacle.

In the occupancy grid map, a region within a fixed range defined with reference to the self-vehicle is divided into a plurality of cells in a grid shape, and a value indicating whether or not an obstacle exists is set for each cell. In this manner, the occupancy grid map is divided into a region where an obstacle exists, a free space where no obstacle exists, and an unknown region where existence of an obstacle is undetermined.

Thereafter, in the attribute-attached occupancy grid map, an attribute based on semantic segmentation data is given to the region where an obstacle exists in the occupancy grid map.

The attribute-attached occupancy grid map obtained in such a manner will be hereinafter referred to as a labelled occupancy map.

The edge extraction unit 25 extracts an edge portion between a non-moving body of obstacles and a free space in the labelled occupancy map received from the map generation unit 24.

The non-moving body herein refers to an obstacle which usually does not move, such as a building and other structures, a roadside tree, a traffic light, and a telegraph pole. Accordingly, a different vehicle, a motorcycle, a bicycle, a human or the like which may move and is given an attribute of a moving body is not considered in the labelled occupancy map.

The labelled occupancy map including an extracted edge portion (hereinafter referred to as edge image) is supplied to the position estimation unit 26.

The position estimation unit 26 estimates a position of the self-vehicle (self-position) by matching in a shape and an attribute of the non-moving body between the labelled occupancy map and a pre-map stored in the pre-map storage unit 27. The pre-map is a labelled occupancy map prepared beforehand, and may indicate either coordinates in a world coordinate system or coordinates in a local coordinate system. The pre-map is created by a vender or the like supplying map data, or created by traveling of the vehicle itself beforehand.

More specifically, the position estimation unit 26 performs matching in the shape and the attribute of the non-moving body between the edge image received from the edge extraction unit 25 and an edge portion between the non-moving body and a free space in the pre-map stored in the pre-map storage unit 27. Position information indicating a latitude and a longitude, and also posture information indicating a posture of the vehicle are obtained by the matching.

In addition, the position estimation unit 26 filters the position information obtained as a result of the matching on the basis of the motion data received from the visual odometry unit 23. For example, performed herein is weighted addition based on a comparison between the obtained position information and a prediction result of the self-position using Kalman filter. Alternatively, processing using a particle filter may be adopted. Performed in this case are updating positions of respective particles of the particle filter using a speed prediction result calculated by the visual odometry unit 23, generating particles on the basis of a likelihood acquired as a matching result with the pre-map at the respective positions, and obtaining a final position.

(Self-Position Estimation Process)

Described next with reference to a flowchart in FIG. 2 will be a self-position estimation process executed by the vehicle controller 10. The process in FIG. 2 is executed in response to output of an image from the camera 11 to the vehicle controller 10 during traveling of the vehicle.

Figure 2:
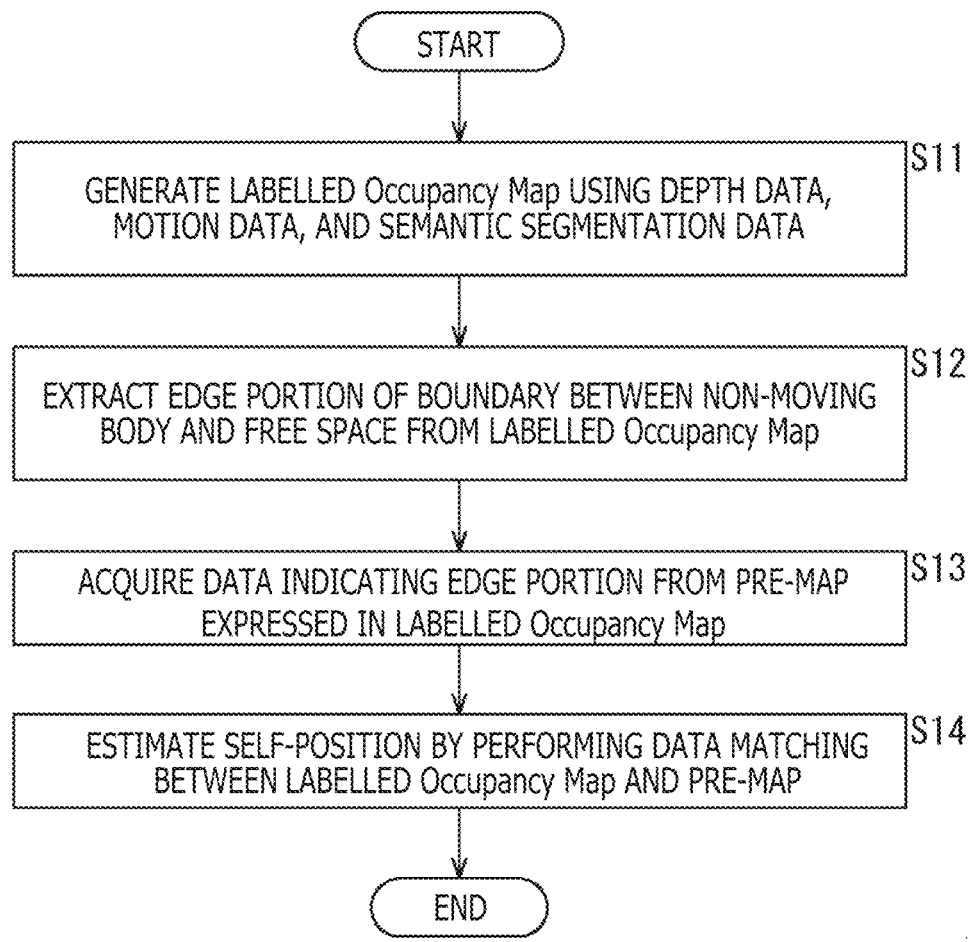
FIG. 2 is a flowchart explaining a self-position estimation process.

Note that the process in FIG. 2 may be repeatedly executed in synchronization with a frame rate of imaging by the camera 11, or may be repeatedly executed in a cycle of a predetermined number of frames.

In step S11, the map generation unit 24 generates a labelled occupancy map using depth data, motion data, and semantic segmentation data.

The depth data, the motion data, and the semantic segmentation data are generated by the depth data generation unit 21, the visual odometry unit 23, and the semantic segmentation unit 22, respectively, and supplied to the map generation unit 24.

Figure 3:
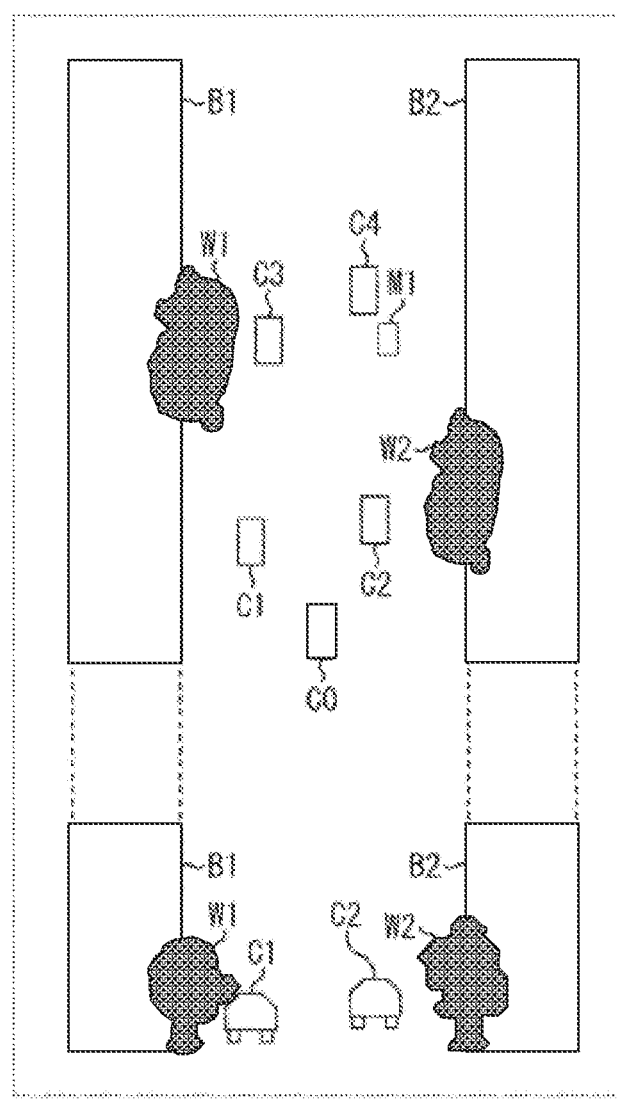
FIG. 3 is a diagram depicting an example of an environment around a vehicle.

FIG. 3 is a diagram depicting an example of an environment around a vehicle during traveling at certain timing.

A bird's eye view depicting an environment including a self-vehicle C0 in a traveling direction of the self-vehicle C0 is presented in an upper part of FIG. 3, while a front view depicting the environment in the traveling direction as viewed from the self-vehicle C0 is presented in a lower part of FIG. 3. Accordingly, an upward direction in the figure corresponds to the traveling direction of the self-vehicle C0 in the bird's eye view in the upper part of FIG. 3, while a depth direction in the figure corresponds to the traveling direction of the self-vehicle C0 in the front view in the lower part of FIG. 3.

In the example in FIG. 3, two different vehicles C1 and C2 are traveling before the self-vehicle C0, and two different vehicles C3 and C4 and a motorcycle M1 are traveling before the different vehicles C1 and C2. A structure B1 stands and a roadside tree W1 is planted on the left side of a road where the self-vehicle C0 is traveling. Moreover, a structure B2 stands and a roadside tree W2 is planted on the right side of the road where the self-vehicle C0 is traveling.

Figure 4:
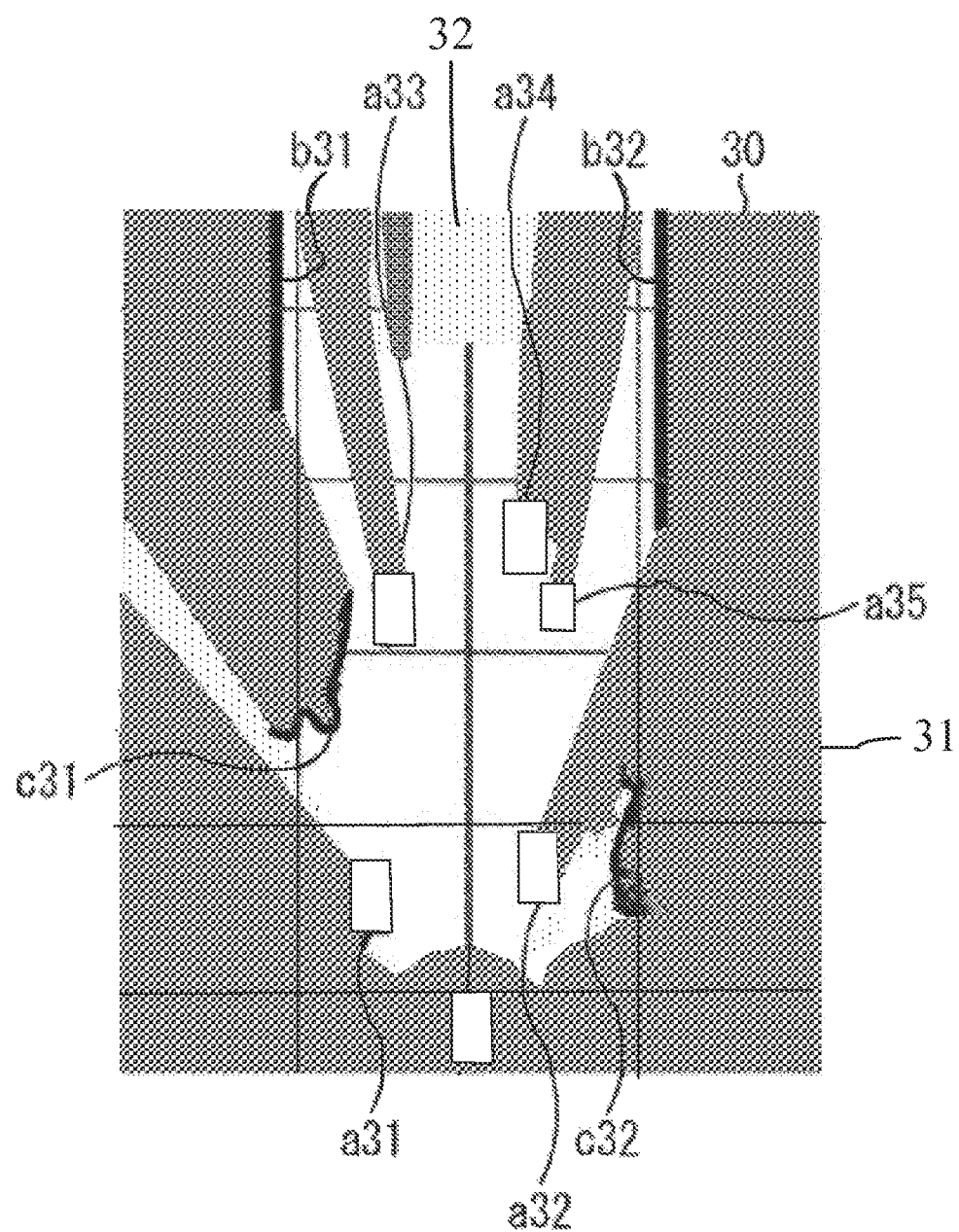
FIG. 4 is a diagram depicting an example of labelled occupancy map.

A labelled occupancy map depicted in FIG. 4 is generated using depth data, motion data, and semantic segmentation data generated on the basis of an image and distance information obtained in such an environment.

In a labelled occupancy map 30 depicted in FIG. 4, a free space where no obstacle exists is expressed as a region 32, an unknown region where existence of obstacles is undetermined is expressed as a region 31, and regions where obstacles exist are expressed as regions a31 to a35, b31, b32, c31, and c32.

In the labelled occupancy map 30, each of regions a31 to a34 corresponding to the different vehicles C1 to C4 in the regions where the obstacles exist has label information indicating an attribute of a vehicle, while a region a35 corresponding to the motorcycle M1 has label information indicating an attribute of a motorcycle.

Moreover, in the labelled occupancy map 30, each of regions b31 and b32 corresponding to the different vehicles B1 and B2 has label information indicating an attribute of a structure, while each of regions c31 and c32 corresponding to the roadside trees W1 and W2 has label information indicating an attribute of a roadside tree.

Returning to the flowchart in FIG. 2, in step S12, the edge extraction unit 25 extracts edge portions between the non-moving bodies of the obstacles and the free space from the labelled occupancy map.

More specifically, extracted from the labelled occupancy map 30 in FIG. 4 are edge portions between the free space and the obstacles except for the regions a31 to a35 each having the label information indicating the vehicle or the motorcycle as moving bodies. In this manner, an edge image depicted in FIG. 5 is generated.

Figure 5:
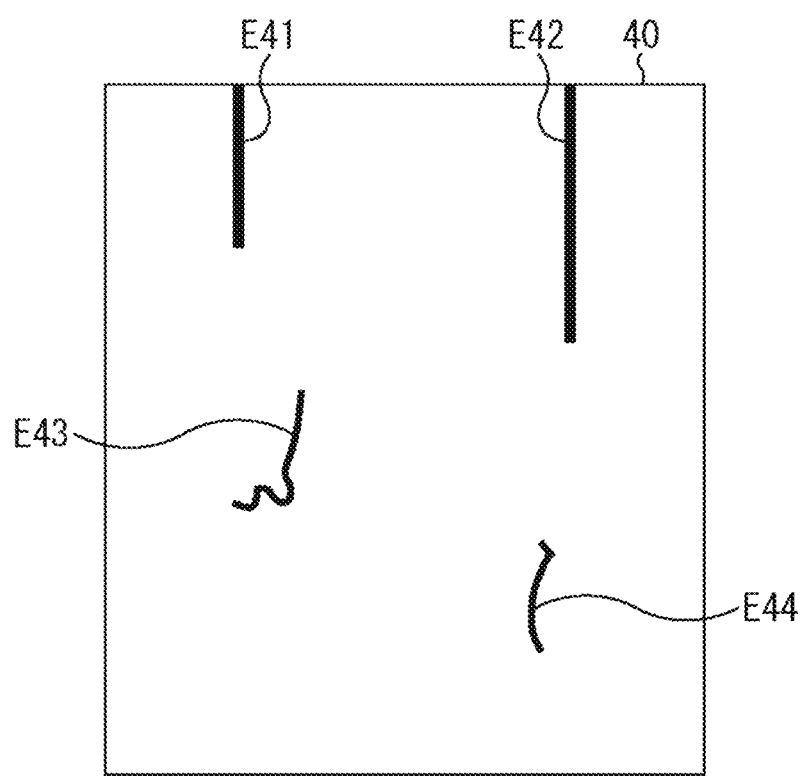
FIG. 5 is a diagram depicting an example of an edge image.

The edge image 40 depicted in FIG. 5 includes edge regions E41 and E42 as edge portions of the regions b31 and b32, and edge regions E43 and E44 as edge portions of the regions c31 and c32 in the labelled occupancy map 30. Each of the edge regions E41 and E42 has label information indicating a structure, while each of the edge regions E43 and E44 has label information indicating a roadside tree.

Accordingly, the edge image 40 is information indicating shapes of the non-moving bodies, and attributes of the non-moving bodies in the labelled occupancy map 30.

Returning to the flowchart in FIG. 2, in step S13, the position estimation unit 26 acquires data indicating the edge portions from a pre-map expressed in the labelled occupancy map.

In subsequent step S14, the position estimation unit 26 performs data matching between the generated labelled occupancy map and the pre-map to estimate a self-position.

Figure 6:
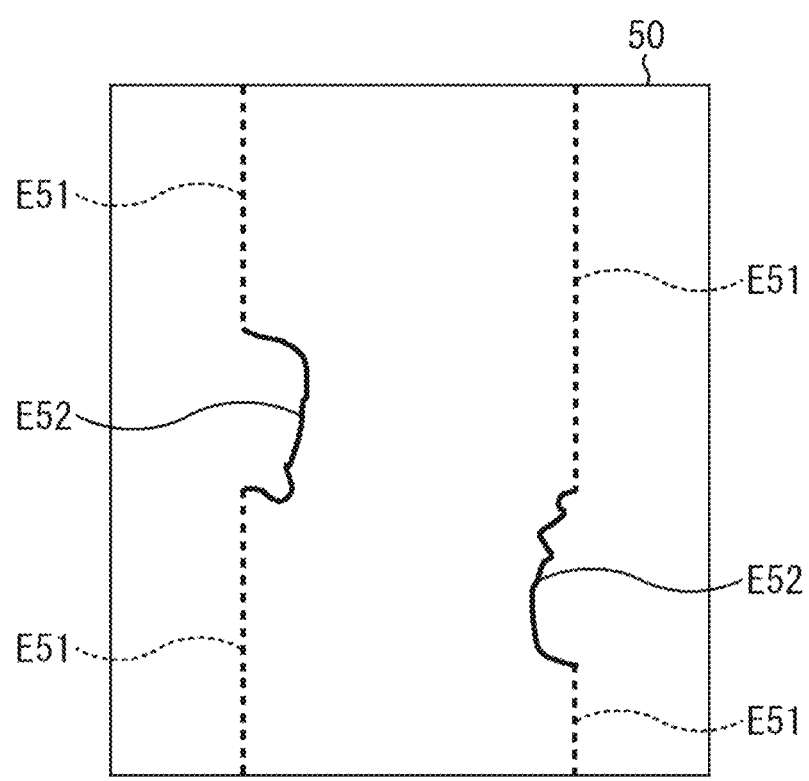
FIG. 6 is a diagram depicting an example of a pre-map.

FIG. 6 is a diagram depicting an example of a pre-map.

A pre-map 50 in FIG. 6 is depicted as an edge image including the extracted edge portions between the obstacles (non-moving bodies) and the free space in the pre-map expressed in the labelled occupancy map. The pre-map 50 includes edge regions E51 each of which has label information indicating a structure, and edge regions E52 each of which has label information indicating a roadside tree.

The pre-map 50 is map data indicating a range sufficiently wider than a range indicated by the labelled occupancy map generated during traveling of the vehicle. Accordingly, the pre-map 50 in FIG. 6 indicates data at a particular position in the entire pre-map 50 stored in the pre-map storage unit 27.

The position estimation unit 26 performs matching in shapes of the edge regions and label information between the entire pre-map 50 and the edge image 40 in FIG. 5. In addition, the position estimation unit 26 designates a self-position which is a position where the shapes of the edge regions and the label information in the edge image 40 exhibit highest agreement with those in the entire pre-map 50.

Figure 7:
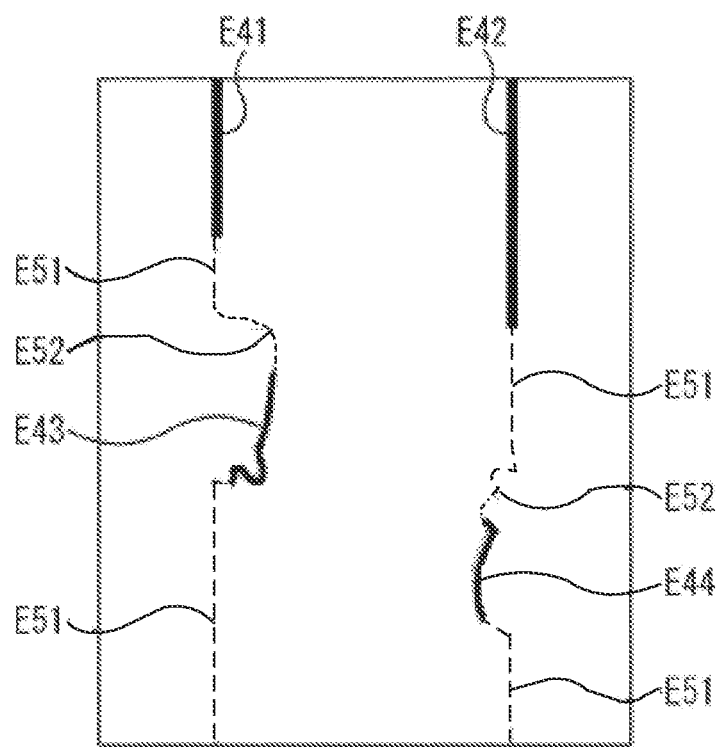
FIG. 7 is a diagram explaining matching between the labelled occupancy map and the pre-map.

More specifically, as depicted in FIG. 7, designated as the self-position is a position where agreement in the shapes and the label information is exhibited between the edge regions E41 and E42 of the edge image 40 and the edge regions E51, and between the edge regions E43 and E44 of the edge image 40 and the edge regions E52 in the entire pre-map 50.

According to the process described above, matching between the labelled occupancy map and the pre-map is achievable while unaffected by the moving bodies such as the different vehicles and the pedestrian. Therefore, an accurate self-position of the self-vehicle can be obtained.

(Different Example of Matching)

Label information associated with the free space may be further used for the above-described matching between the labelled occupancy map and the pre-map.

Figure 8:
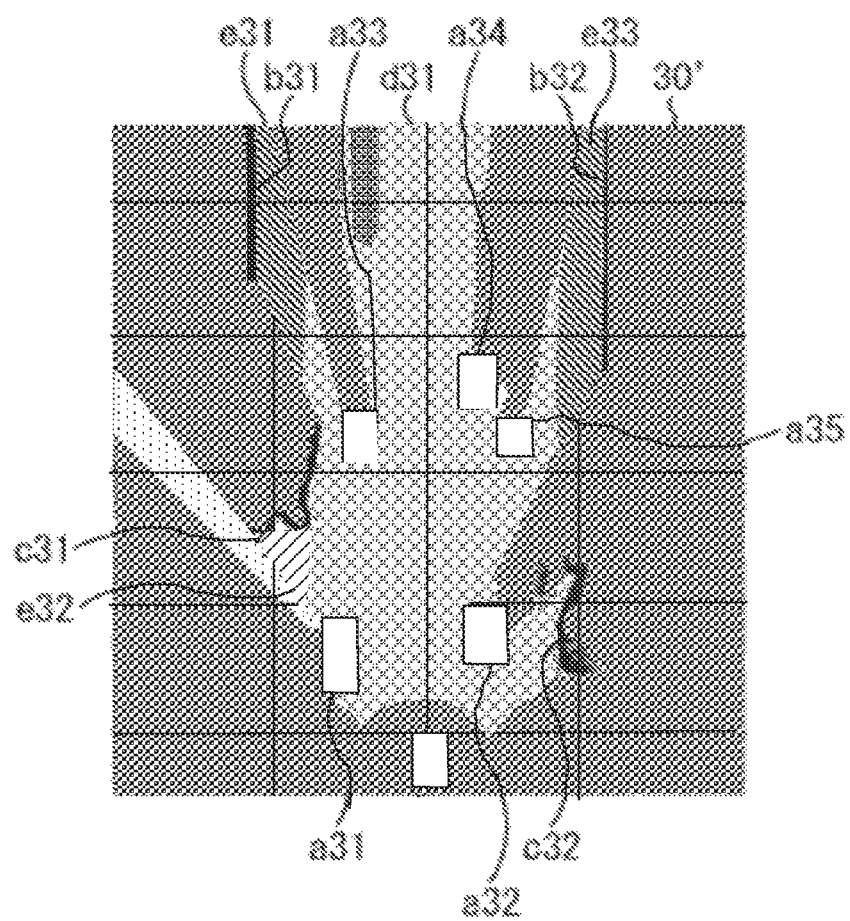
FIG. 8 is a diagram depicting another example of the labelled occupancy map.

FIG. 8 depicts an example of a labelled occupancy map which has label information for a free space.

In a labelled occupancy map 30' depicted in FIG. 8, regions d31 and e31 to e33 are further defined in the free space of the labelled occupancy map 30 depicted in FIG. 4. The region d31 has label information indicating an attribute of a roadway, while each of the regions e31 to e33 has label information indicating an attribute of a walkway. The label information for the respective regions is obtained by semantic segmentation.

Edge portions between the free space and the obstacles except for the regions a31 to a35 having the label information indicating the vehicle and the motorcycle as moving bodies, and label information for the regions defined in the free space are extracted from the labelled occupancy map 30' in FIG. 8. In this manner, an edge image depicted in FIG. 9 is generated.

Figure 9:
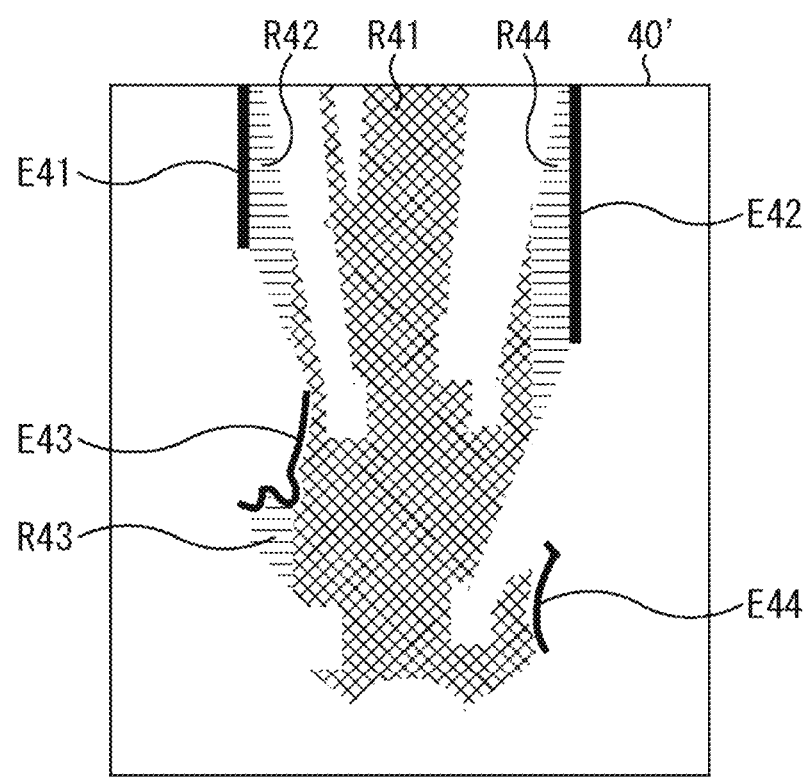
FIG. 9 is a diagram depicting another example of the edge image.

An edge image 40' depicted in FIG. 9 includes regions R41 to R44 in addition to edge regions similar to those of the edge image 40 depicted in FIG. 5. The region R41 corresponds to the region d31 of the labelled occupancy map 30', and has label information indicating a roadway. The regions R42 and R43 correspond to the regions e31 to e33 of the labelled occupancy map 30', and has label information indicating a walkway.

Figure 10:
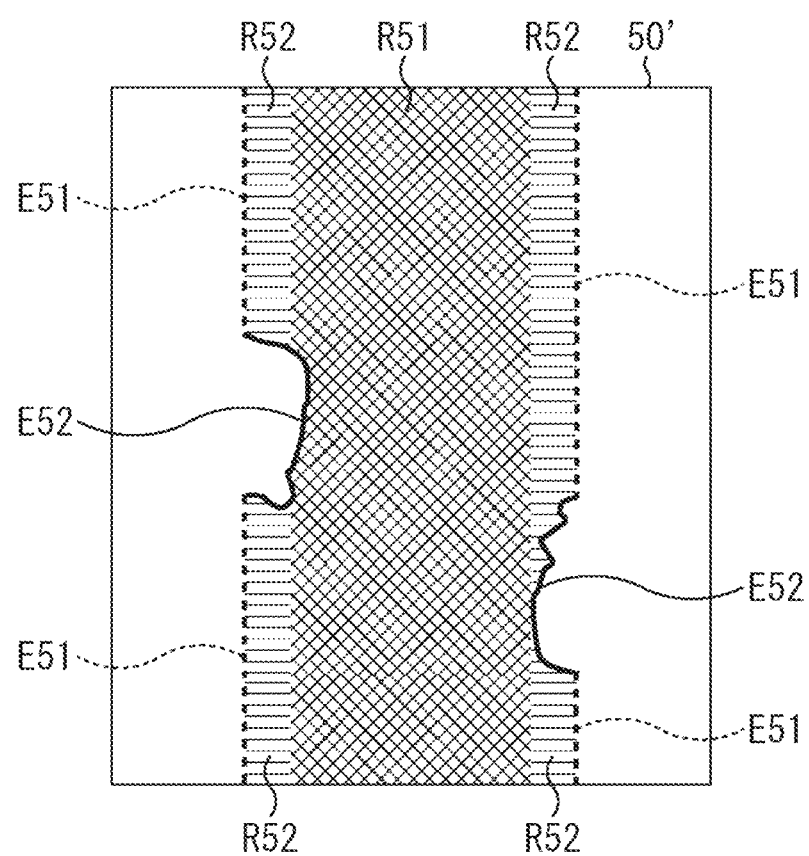
FIG. 10 is a diagram depicting another example of the pre-map.

FIG. 10 depicts another example of the pre-map.

A pre-map 50' in FIG. 10 includes a region R51 which has label information indicating a roadway, and regions R52 each of which has label information indicating a walkway, in addition to regions similar to the regions in the pre-map 50 in FIG. 6. The pre-map 50' in FIG. 10 also indicates data at a particular position in the entire pre-map.

In addition, the self-position is obtained by matching in shapes of edge regions and label information between the entire pre-map 50' and the edge image 40' in FIG. 9.

In such a manner, accuracy of matching can be raised by using the label information associated with the free space as well for the matching between the labelled occupancy map and the pre-map. Accordingly, a more accurate self-position of the self-vehicle can be obtained.

Moreover, while the labelled occupancy map expresses a space around the vehicle as a two-dimensional space, a plurality of labelled occupancy maps in a height direction may be generated to express the space around the vehicle as a three-dimensional space by adopting a layer configuration. In this case, the pre-map adopts a similar configuration, and matching is performed for each layer in the matching between the labelled occupancy map and the pre-map.

2. Pre-Map Generation Method

A pre-map generation method will be herein described.

As described above, the pre-map is generated from manual drive traveling of the vehicle performed beforehand, and may indicate either coordinates in a world coordinate system or coordinates in a local coordinate system.

Pre-Map Generation Process Example 1

Figure 11:
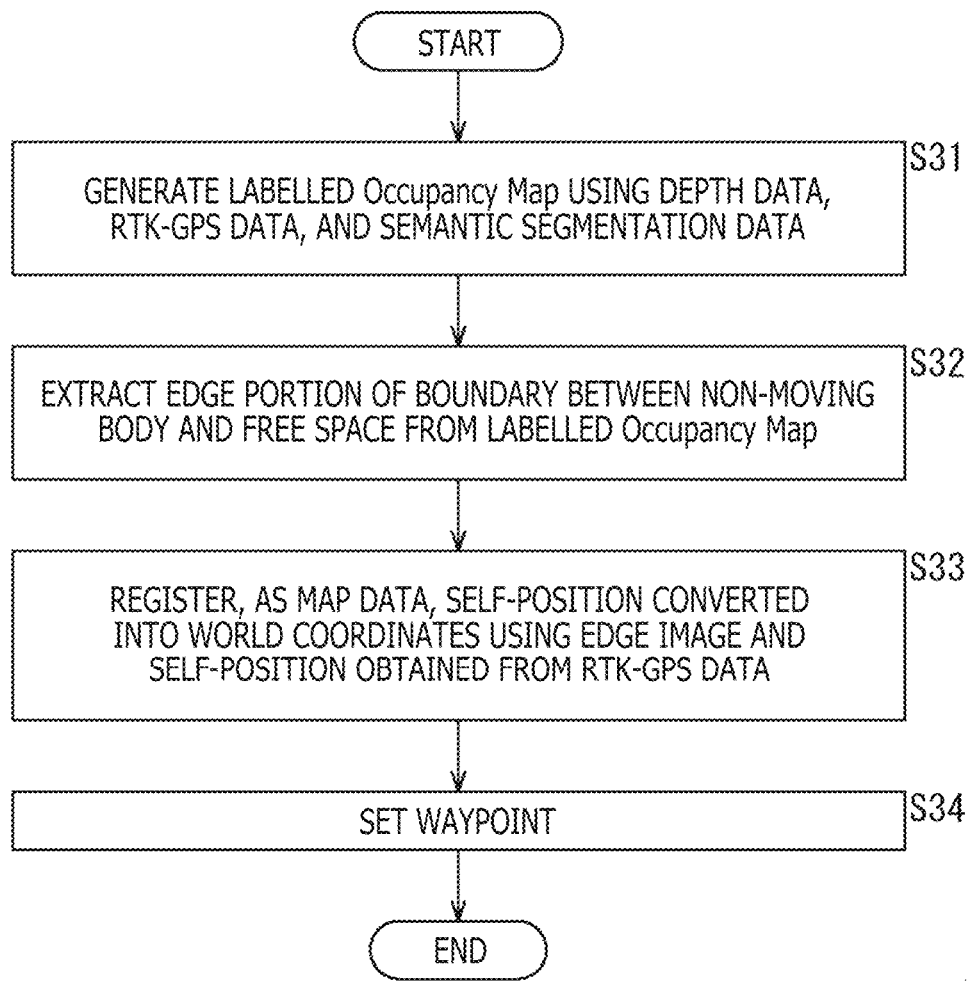
FIG. 11 is a flowchart explaining a pre-map generation process.

An example of a process for generating a pre-map in the world coordinate system will be initially described with reference to a flowchart in FIG. 11. The process in FIG. 11 is implemented by traveling of a vehicle which carries a sensor capable of performing RTK-GPS (Real Time Kinematic GPS) measurement in addition to the vehicle controller 10, the camera 11, and the LiDAR 12.

In step S31, the map generation unit 24 generates a labelled occupancy map using depth data, RTK-GPS data, and semantic segmentation data.

In this step, a labelled occupancy map is generated using RTK-GPS data acquired by the sensor capable of performing RTK-GPS measurement instead of motion data generated by the visual odometry unit 23.

In step S32, the edge extraction unit 25 extracts edge portions between non-moving bodies of obstacles and a free space from the labelled occupancy map. As a result, an edge image is generated.

In step S33, the position estimation unit 26 registers a self-position converted into world coordinates as map data using the generated edge image and a self-position obtained from the RTK-GPS data. As a result, the position of the self-vehicle at that time is stored in the pre-map storage unit 27 as a labelled occupancy map.

In step S34, the position estimation unit 26 further obtains an ideal route for autonomous driving, and sets a waypoint on the registered pre-map.

The waypoint herein refers to not information which indicates a road for a route, but information which indicates a lane for traveling on a road (road surface).

A pre-map in the world coordinate system unaffected by moving bodies can be generated by the process described above.

Note that the labelled occupancy map generated using the RTK-GPS data as described above may be generated using position data obtained by other position measurement utilizing GNSS (Global Navigation Satellite System).

Pre-Map Generation Process Example 2

Figure 12:
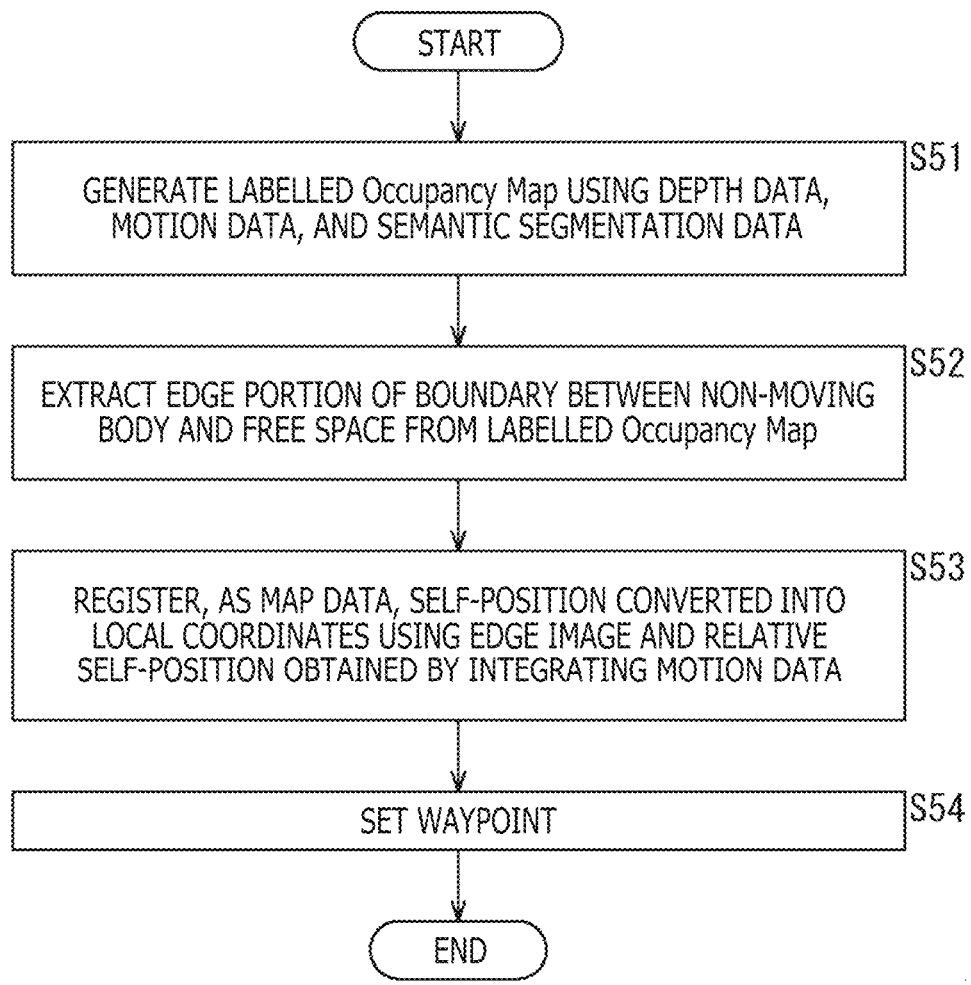
FIG. 12 is a flowchart explaining a pre-map generation process.

An example of a process for generating a pre-map in the local coordinate system will be next described with reference to a flowchart in FIG. 12. The process in FIG. 11 is implemented by traveling of a vehicle which carries the vehicle controller 10, the camera 11, and the LiDAR 12.

In step S51, the map generation unit 24 generates a labelled occupancy map by using depth data, motion data, and semantic segmentation data.

In this step, the labelled occupancy map is generated using motion data generated by the visual odometry unit 23.

In step S52, the edge extraction unit 25 extracts edge portions between non-moving bodies of obstacles and a free space from the labelled occupancy map. In this manner, an edge image is generated.

In step S53, the position estimation unit 26 registers a self-position converted into local coordinates as map data using the generated edge image and a relative self-position obtained by integrating the motion data. As a result, the position of the self-vehicle at that time is stored in the pre-map storage unit 27 as a labelled occupancy map.

In step S54, the position estimation unit 26 further obtains an ideal route for autonomous driving, and sets a waypoint on the registered pre-map.

A pre-map in the local coordinate system unaffected by moving bodies can be generated by the process described above.

In the process described above, the waypoint may be set on the basis of linear shapes of the obstacles or the roads in the generated pre-map.

For example, the waypoint is set such that the vehicle travels closer to a road center in a case where the obstacle existing on the road side is a roadside tree than in a case where the corresponding obstacle is a telegraph pole. Moreover, in a case where the road is curved, the waypoint is set such that a radius of curvature of the route becomes smaller.

Note that setting of the waypoint is not necessarily required but may be omitted in the pre-map generation process.

3. Second Embodiment

Autonomous driving of a vehicle is achievable on the basis of a waypoint set by the pre-map generation process described above. Accordingly, a configuration for performing autonomous driving of the vehicle will be hereinafter described.

Configuration Example of Vehicle Controller

Figure 13:
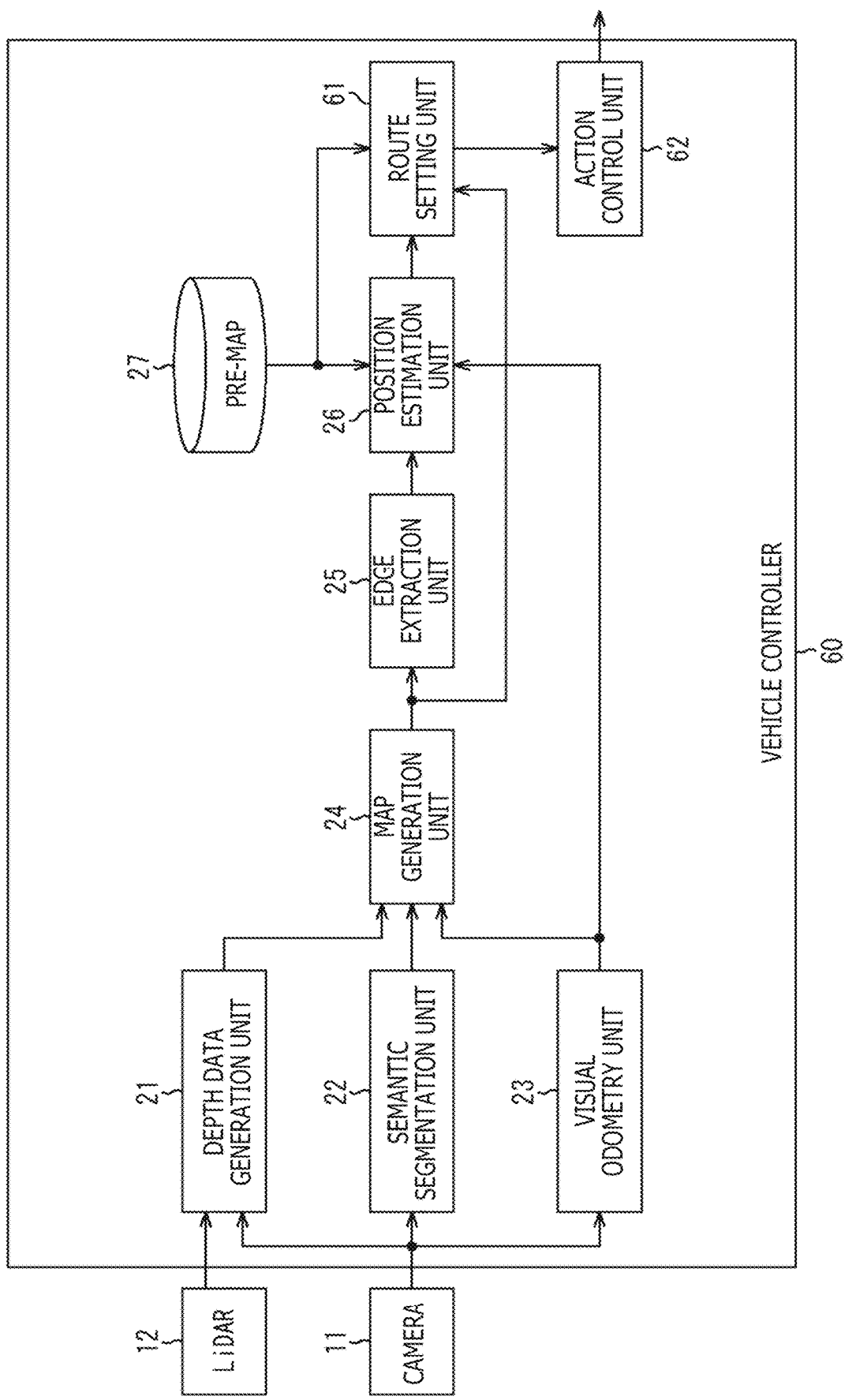
FIG. 13 is a block diagram depicting another configuration example of the vehicle controller.

FIG. 13 is a block diagram depicting a configuration example of a vehicle controller according to a second embodiment to which the present technology is applied.

A vehicle controller 60 in FIG. 13 includes a route setting unit 61 and an action control unit 62 in addition to a configuration similar to the configuration of the vehicle controller 10 in FIG. 1.

The route setting unit 61 sets a traveling route (moving route) of the self-vehicle using a self-position estimated by the position estimation unit 26 and a waypoint set for a pre-map stored in the pre-map storage unit 27.

Alternatively, in a case where no waypoint is set for the pre-map, the route setting unit 61 may acquire a labelled occupancy map from the map generation unit 24, and set a waypoint in real time in such a manner as to avoid a moving body, for example, to set the traveling route.

Route information indicating the set traveling route is supplied to the action control unit 62.

The action control unit 62 controls actions of the self-vehicle to achieve travelling along the traveling route indicated by the route information received from the route setting unit 61 on the basis of the route information. More specifically, the action control unit 62 controls actions of respective driving mechanisms equipped on the vehicle, such as a steering mechanism associated with steering, a braking unit associated with braking, and an engine and a driving motor associated with driving (traveling).

Furthermore, the action control unit 62 controls illumination of headlights equipped on a front part of the vehicle. More specifically, the action control unit 62 controls illumination angles of the headlights such that a front in the traveling route is illuminated with light on the basis of the route information indicating the traveling route.

In such a manner, control of driving assistance (autonomous driving) of the vehicle is achieved by the action control unit 62.

(Autonomous Driving Control Process)

Described next with reference to a flowchart in FIG. 14 will be an autonomous driving control process executed by the vehicle controller 60.

Figure 14:
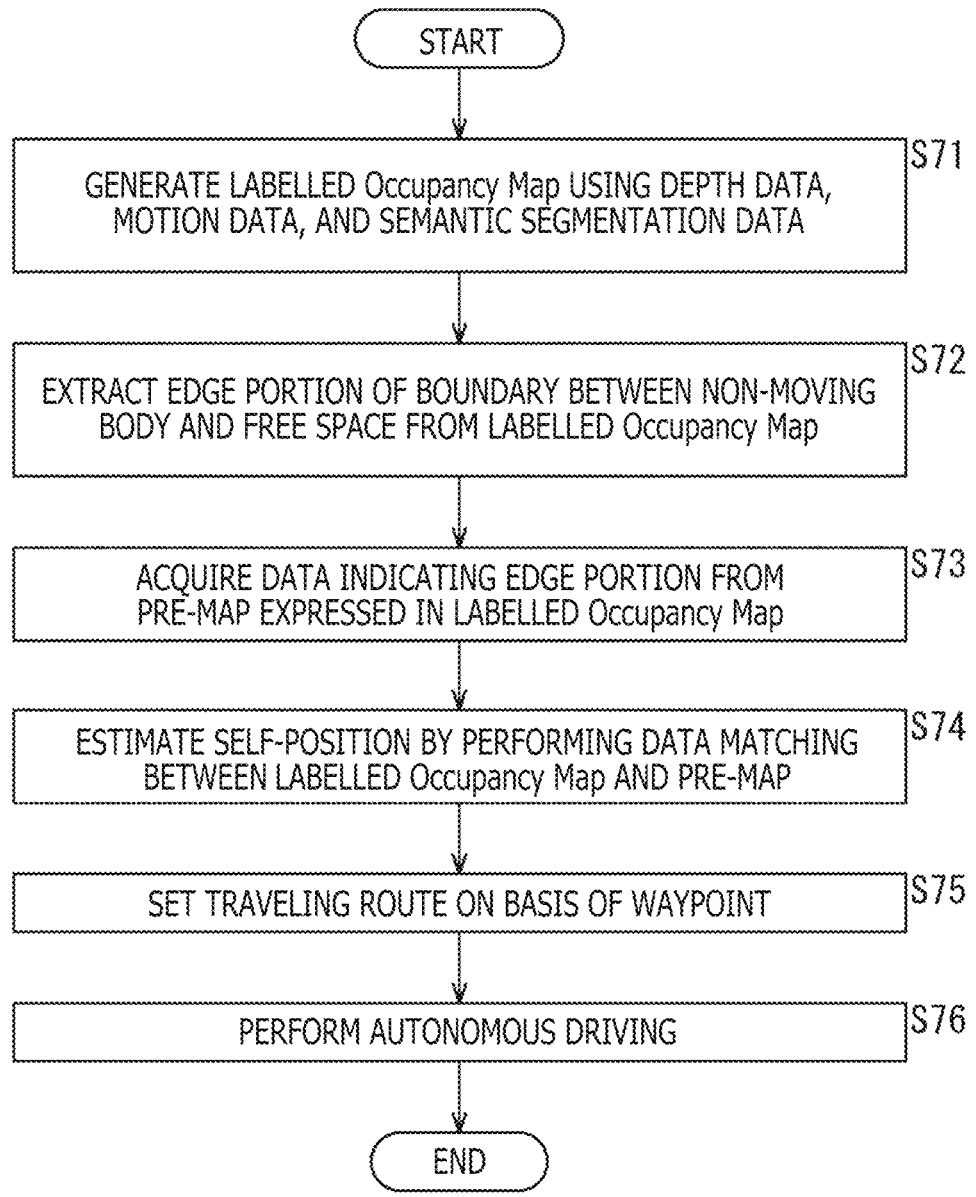
FIG. 14 is a flowchart explaining an autonomous driving control process.

Note that processing from steps S71 to S74 in the flowchart in FIG. 14 is similar to processing from steps S11 to S14 in the flowchart in FIG. 2. Accordingly, the description of this processing is omitted.

After the self-position is estimated in step S74, the route setting unit 61 in step S75 refers to a pre-map stored in the pre-map storage unit 27, and sets a traveling route of the self-vehicle on the basis of a waypoint set for the pre-map.

For example, a range of the pre-map referred to by the route setting unit 61 is set to a range including a position used for matching at the time of estimation of the self-position.

In a case where no waypoint is set for the pre-map, note that the route setting unit 61 acquires a labelled occupancy map from the map generation unit 24, and sets a waypoint in real time to set the traveling route.

In step S76, the action control unit 62 controls actions of the self-vehicle on the basis of route information indicating a set traveling route to control autonomous driving.

Autonomous driving of the vehicle is achievable in the manner described above.

For example, a pre-map is generated for a route along which manual drive traveling has been once made, and a waypoint is set for this route. Thereafter, the vehicle is allowed to autonomously travel to a destination while estimating the self-position.

In such a manner, valet parking by autonomous driving is achievable, for example.

Initially, a user drives the vehicle by manual driving along a route from an entrance of a home apartment to a nearby parking lot to generate a pre-map for which a waypoint is set.

Thereafter, the vehicle can autonomously move to the parking lot on the basis of estimation of the self-position and the pre-map for which the waypoint is set even in a case where the user drives the vehicle by manual driving from an outside place to the entrance of the home apartment and leaves the vehicle.

4. Third Embodiment

During autonomous driving of a vehicle as described above, the vehicle may pass through a place where a dangerous phenomenon causing an accident may occur. Accordingly, a configuration for correcting a waypoint to avoid a danger will be hereinafter described.

Configuration Example of Vehicle Controller

Figure 15:
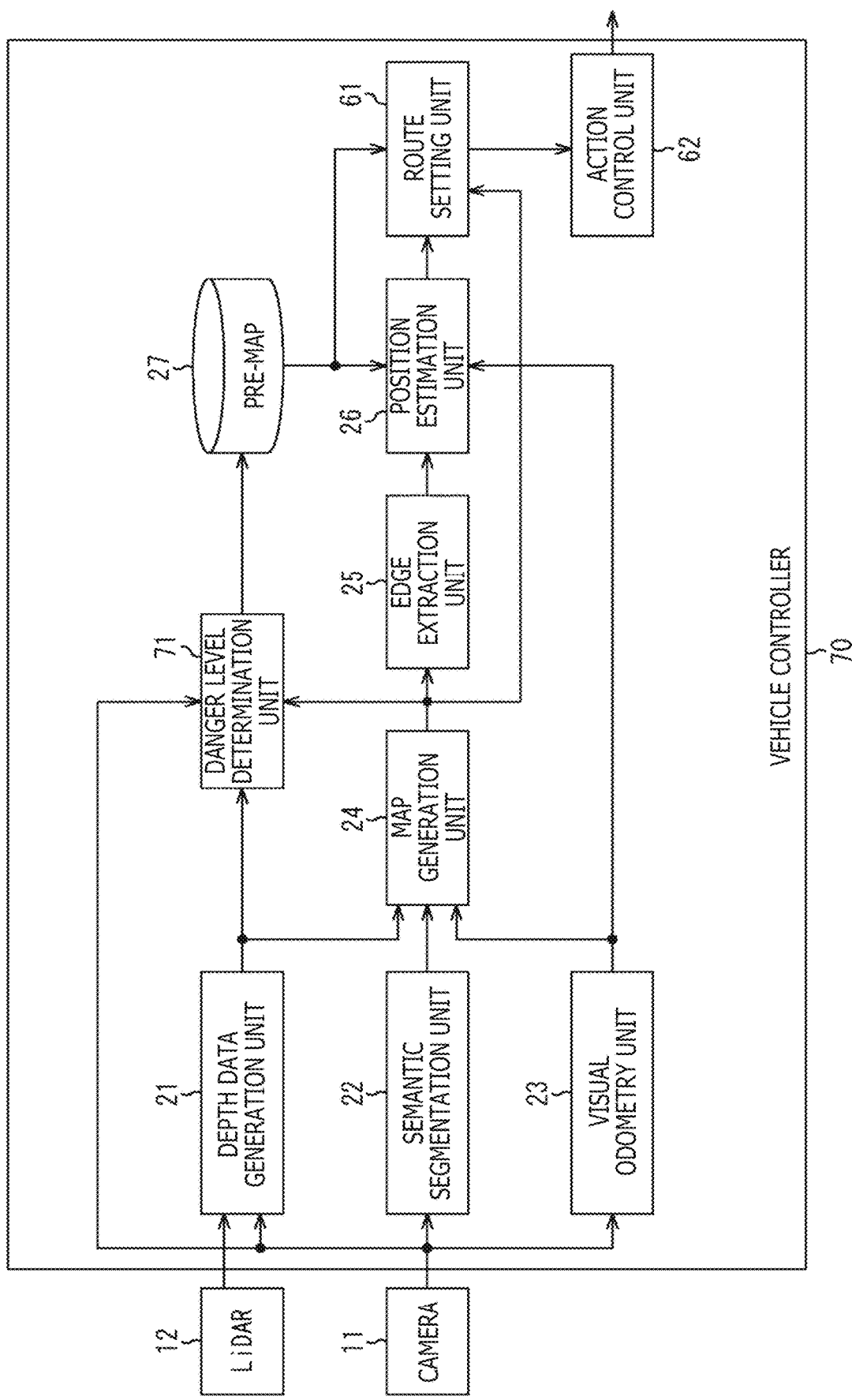
FIG. 15 is a block diagram depicting a further configuration example of the vehicle controller.

FIG. 15 is a block diagram depicting a configuration example of a vehicle controller according to a third embodiment to which the present technology is applied.

A vehicle controller 70 in FIG. 15 includes a danger level determination unit 71 in addition to a configuration similar to the configuration of the vehicle controller 60 in FIG. 13.

The danger level determination unit 71 determines a danger level of a vehicle during traveling on the basis of an image received from the camera 11, depth data received from the depth data generation unit 21, and a labelled occupancy map received from the map generation unit 24. The danger level is an index (value) indicating a likelihood of occurrence of a dangerous phenomenon causing an accident.

For example, in a case where a child runs out from a place behind a telegraph pole within the imaging range of the camera 11, detected is such a region where distance information drastically decreases in the depth data, or a drastic change of motion of an obstacle (moving body) in the labelled occupancy map.

In such a case, the danger level determination unit 71 determines detection of a danger, and calculates a danger level at that location. Thereafter, the danger level determination unit 71 sets a calculated danger level for the corresponding location in the pre-map stored in the pre-map storage unit 27.

The danger level is accumulated for each location on the pre-map. Accordingly, every time repeated detection of a danger is determined at an identical location, the danger level at the corresponding location is added to increase the danger level.

Furthermore, in a case where a waypoint is set for the pre-map, the danger level determination unit 71 corrects the waypoint to avoid a location of a high danger level on the basis of a danger level set for the pre-map.

(Waypoint Correction Process)

Figure 16:
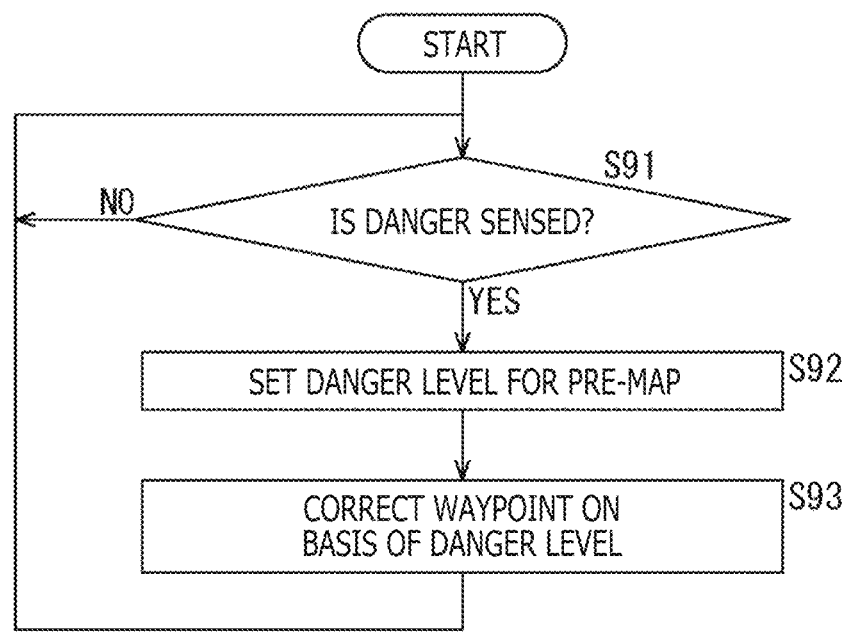
FIG. 16 is a flowchart explaining a waypoint correction process.

Described next with reference to a flowchart in FIG. 16 will be a waypoint correction process executed by the vehicle controller 70. The process in FIG. 16 is executed during traveling of the vehicle (e.g., during autonomous driving). In addition, it is assumed herein that a waypoint has been set for a pre-map stored in the pre-map storage unit 27.

In step S91, the danger level determination unit 71 determines whether or not a danger has been detected on the basis of an image received from the camera 11, depth data received from the depth data generation unit 21, and a labelled occupancy map received from the map generation unit 24.

Processing in step S91 is repeated until detection of a danger is determined. When detection of a danger is determined, the danger level determination unit 71 calculates a danger level at a corresponding location. The process proceeds to step S92.

In step S92, the danger level determination unit 71 sets a calculated danger level for the corresponding location in the pre-map stored in the pre-map storage unit 27.

In subsequent step S93, the danger level determination unit 71 corrects the waypoint on the basis of the danger level set for the pre-map to avoid a location of a high danger level.

According to the process described above, a danger level of a dynamic obstacle is empirically accumulated, and the waypoint is corrected on the basis of the degree of the accumulated danger levels. In this manner, traveling is achievable while avoiding a place where a dangerous phenomenon causing an accident may occur during autonomous driving.

5. Example of Moving Body Control System

The present technology is applicable to a system which controls a moving body other than a vehicle. For example, the present technology is applicable to a vehicle control system depicted in FIG. 17.

FIG. 17 is a block diagram depicting a configuration example of schematic functions of a vehicle control system 100 as an example of a moving body control system to which the present technology is applicable.

Note that a vehicle equipped with the vehicle control system 100 will be hereinafter referred to as a self-car or a self-vehicle in a case where the vehicle is distinguished from a different vehicle.

The vehicle control system 100 includes an input unit 101, a data acquisition unit 102, a communication unit 103, in-vehicle equipment 104, an output control unit 105, an output unit 106, a drive control unit 107, a drive system 108, a body control unit 109, a body system 110, a storage unit 111, and an autonomous driving control unit 112. The input unit 101, the data acquisition unit 102, the communication unit 103, the output control unit 105, the drive control unit 107, the body control unit 109, the storage unit 111, and the autonomous driving control unit 112 are connected to each other through a communication network 121. For example, the communication network 121 includes an in-vehicle communication network, a bus or the like in conformity with any standards such as a CAN (Controller Area Network), a LIN (Local Interconnect Network), a LAN (Local Area Network), and FlexRay (registered trademark). Note that the respective units of the vehicle control system 100 are directly connected without using the communication network 121 in some cases.

Note that description of the communication network 121 is hereinafter omitted in a case where the respective units of the vehicle control system 100 communicate with each other through the communication network 121. For example, in a case where the input unit 101 and the autonomous driving control unit 112 communicate with each other through the communication network 121, this state is described in a simplified manner that the input unit 101 and the autonomous driving control unit 112 communicate with each other.

The input unit 101 includes units used by a passenger to input various kinds of data, instructions, and the like. For example, the input unit 101 includes operation devices such as a touch panel, a button, a microphone, a switch, and a lever, operation devices capable of receiving input by methods other than manual operations, such as voices and gestures, and others. Moreover, for example, the input unit 101 may be a remote controller utilizing infrared light or other radio waves, or external connection equipment such as mobile equipment and wearable equipment corresponding to operations of the vehicle control system 100. The input unit 101 generates an input signal on the basis of data, instructions and the like input from the passenger, and supplies the generated input signal to the respective units of the vehicle control system 100.

The data acquisition unit 102 includes various sensors and the like which acquire data used for processing performed by the vehicle control system 100, and supplies the acquired data to the respective units of the vehicle control system 100.

For example, the data acquisition unit 102 includes various sensors for detecting a state or the like of the self-car. More specifically, the data acquisition unit 102 includes a gyro sensor, an accelerometer, an inertial measurement unit (IMU), a sensor for detecting an operation amount of an accelerator pedal, an operation amount of a brake pedal, a steering angle of a steering wheel, an engine speed, a motor speed, a rotation speed of wheels, or the like, and others.

Furthermore, for example, the data acquisition unit 102 includes various sensors for detecting information outside the self-car. More specifically, for example, the data acquisition unit 102 includes an imaging apparatus such as a ToF (Time OF Flight) camera, a stereo camera, a monocular camera, an infrared camera, and other types of camera. In addition, for example, the data acquisition unit 102 includes an environment sensor for detecting a weather, an atmospheric phenomenon or the like, and an ambient information detection sensor for detecting objects around the self-car. Examples of the environment sensor include a rain drop sensor, a fog sensor, a solar irradiation sensor, and a snow sensor. Examples of the ambient information detection sensor include an ultrasonic sensor, a radar, a LiDAR (Light Detection and Ranging, Laser Imaging Detection and Ranging), and a sonar.

Furthermore, for example, the data acquisition unit 102 includes various sensors for detecting a current position of the self-car. More specifically, for example, the data acquisition unit 102 includes a GNSS (Global Navigation Satellite System) receiver or the like for receiving a GNSS signal from a GNSS satellite.

In addition, for example, the data acquisition unit 102 includes various sensors for detecting information inside the car. More specifically, for example, the data acquisition unit 102 includes an imaging apparatus imaging a driver, a biological sensor detecting biological information associated with the driver, a microphone collecting voices inside a car compartment, and the like. For example, the biological sensor is provided on a seat surface, a steering wheel or the like, and detects biological information associated with the passenger sitting on a seat or the driver holding a steering wheel.

The communication unit 103 communicates with the in-vehicle equipment 104, and various kinds of equipment outside the car, a server, a base station and the like to transmit data supplied from the respective units of the vehicle control system 100 and supply received data to the respective units of the vehicle control system 100. Note that a communication protocol supported by the communication unit 103 is not particularly limited. In addition, a plurality of types of communication protocols may be supported by the communication unit 103.

For example, the communication unit 103 wirelessly communicates with the in-vehicle equipment 104 using a wireless LAN, Bluetooth (registered trademark), NFC (Near Field Communication), a WUSB (Wireless USB) or the like. Moreover, for example, the communication unit 103 communicates with the in-vehicle equipment 104 by wire through a not-depicted connection terminal (and a cable if necessary) using a USB (Universal Serial Bus), HDMI (registered trademark) (High-Definition Multimedia Interface), an MHL (Mobile High-definition Link) or the like.

Furthermore, for example, the communication unit 103 communicates with equipment (e.g., application server or control server) existing on an external network (e.g., Internet, cloud network, or company-specific network) through a base station or an access point. In addition, for example, the communication unit 103 communicates with a terminal existing near the self-car (e.g., a terminal of a pedestrian or a store, or an MTC (Machine Type Communication) terminal) using a P2P (Peer To Peer) technology. Furthermore, for example, the communication unit 103 performs V2X communication such as vehicle-to-vehicle (Vehicle to Vehicle) communication, vehicle-to-road (Vehicle to Infrastructure) communication, vehicle-to-home (Vehicle to Home) communication, and vehicle-to-pedestrian (Vehicle to Pedestrian) communication. Moreover, for example, the communication unit 103 includes a beacon reception unit, and receives radio waves or electromagnetic waves emitted from a wireless station or the like provided on a road to acquire information indicating a current position, a traffic jam, a traffic restriction, a required time or the like.

For example, the in-vehicle equipment 104 includes mobile equipment or wearable equipment carried by the passenger, information equipment loaded or attached to the self-car, a navigation apparatus which searches a route to any destination, and others.

The output control unit 105 controls output of various types of information to the passenger of the self-car or the outside of the car. For example, the output control unit 105 generates an output signal including at least either visual information (e.g., image data) or audio information (e.g., audio data), and supplies the output signal to the output unit 106 to control output of visual information and audio information from the output unit 106. More specifically, for example, the output control unit 105 synthesizes image data captured by different imaging units of the data acquisition unit 102 to generate a bird's-eye image, a panorama image or the like, and supplies an output signal including the generated image to the output unit 106. Moreover, for example, the output control unit 105 generates audio data including a warning sound, a warning message or the like for a danger such as collision, contact, and entrance into a dangerous zone, and supplies an output signal including the generated audio data to the output unit 106.

The output unit 106 includes a unit capable of outputting visual information or audio information to the passenger of the self-car or the outside of the car. For example, the output unit 106 includes a display unit, an instrument panel, an audio speaker, a headphone, a wearable device such as a glass-type display worn by the passenger, a projector, a lamp, or the like. The display unit included in the output unit 106 may be a unit which displays visual information within a field of vision of the driver, such as a head-up display, a transmission-type display, and a unit having an AR (Augmented Reality) display function, as well as a unit including an ordinary display.

The drive control unit 107 generates various control signals, and supplies the control signals to the drive system 108 to control the drive system 108. Moreover, the drive control unit 107 supplies control signals to respective units other than the drive system 108 as necessary to issue a notification regarding a control state of the drive system 108, for example.

The drive system 108 includes various types of apparatuses associated with a drive system of the self-car. For example, the drive system 108 includes a driving force generator for generating a driving force, such as an internal combustion engine and a driving motor, a driving force transmission mechanism for transmitting a driving force to wheels, a steering mechanism for adjusting a steering angle, a braking unit for generating a braking force, an ABS (Antilock Brake System), an ESC (Electronic Stability Control), an electric power steering apparatus, and the like.

The body control unit 109 generates various control signals, and supplies the control signals to the body system 110 to control the body system 110. Moreover, the body control unit 109 supplies control signals to respective units other than the body system 110 as necessary to issue a notification regarding a control state of the body system 110, for example.

The body system 110 includes various types of body-related apparatuses equipped on a vehicle body. For example, the body system 110 includes a keyless entry system, a smart key system, an automatic window unit, an automatic seat, a steering wheel, an air conditioner, and various types of lamps (e.g., head lamp, back lamp, brake lamp, direction indicator, and fog lamp), and the like.

For example, the storage unit 111 includes a magnetic storage device such as a ROM (Read Only Memory), a RAM (Random Access Memory), and an HDD (Hard Disc Drive), a semiconductor storage device, an optical storage device, a magneto-optical storage device, and the like. The storage unit 111 stores various programs, data and the like used by the respective units of the vehicle control system 100. For example, the storage unit 111 stores map data such as a three-dimensional high-accuracy map including a dynamic map, a global map less accurate than the high-accuracy map and covering a wide area, and a local map including information around the self-car.

The autonomous driving control unit 112 performs control associated with autonomous driving, such as autonomous traveling and driving assistance. More specifically, for example, the autonomous driving control unit 112 performs cooperative control for the purpose of implementing functions of ADAS (Advanced Driver Assistance System) including collision avoidance or shock mitigation of the self-car, following traveling based on an inter-vehicle distance, car speed maintenance traveling, self-vehicle collision warning, a self-vehicle lane deviation warning, and the like. In addition, for example, the autonomous driving control unit 112 performs cooperative control for the purpose of achieving autonomous driving and the like for autonomous traveling without an operation by the driver. The autonomous driving control unit 112 includes a detection unit 131, a self-position estimation unit 132, a situation analysis unit 133, a planning unit 134, and an action control unit 135.

The detection unit 131 detects various kinds of information necessary for control of autonomous driving. The detection unit 131 includes an exterior information detection unit 141, an interior information detection unit 142, and a vehicle state detection unit 143.

The exterior information detection unit 141 performs a detection process for detecting information outside the self-car on the basis of data or a signal received from the respective units of the vehicle control system 100. For example, the exterior information detection unit 141 performs a detection process, a recognition process, and a tracking process for an object around the self-car, and a detection process for detecting a distance to the object. Examples of the object as a detection target include a vehicle, a human, an obstacle, a structure, a road, a traffic light, a traffic sign, a road sign, and the like. Moreover, for example, the exterior information detection unit 141 performs a detection process for detecting an ambient environment around the self-car. Examples of the ambient environment as a detection target include a weather, a temperature, a humidity, brightness, a state of a road surface, and the like. The exterior information detection unit 141 supplies data indicating a result of the detection process to the self-position estimation unit 132, and a map analysis unit 151, a traffic rule recognition unit 152, and a situation recognition unit 153 of the situation analysis unit 133, an emergency avoidance unit 171 of the action control unit 135, and the like.

The exterior information detection unit 141 generates depth data, motion data, and semantic segmentation data in correspondence with the depth data generation unit 21, the semantic segmentation unit 22, and the visual odometry unit 23 described above.

The interior information detection unit 142 performs a detection process for detecting information inside the car on the basis of data or a signal received from the respective units of the vehicle control system 100. For example, the interior information detection unit 142 performs an authentication process and a recognition process for the driver, a detection process for detecting a state of the driver, a detection process for detecting the passenger, a detection process for detecting an environment inside the car, and the like. Examples of the state of the driver as a detection target include a physical condition, an awakening level, a concentration level, a fatigue level, an eye direction, and the like. Examples of the environment inside the car as a detection target include a temperature, a humidity, brightness, a smell, and the like. The interior information detection unit 142 supplies data indicating a result of the detection process to the situation recognition unit 153 of the situation analysis unit 133, the emergency avoidance unit 171 of the action control unit 135, and the like.

The vehicle state detection unit 143 performs a detection process for detecting a state of the self-car on the basis of data or a signal received from the respective units of the vehicle control system 100. Examples of the state of the self-car as a detection target include a speed, an acceleration, a steering angle, presence or absence and contents of an abnormality, a state of a driving operation, a position and an inclination of an automatic seat, a state of a door lock, states of other in-vehicle equipment, and the like. The vehicle state detection unit 143 supplies data indicating a result of the detection process to the situation recognition unit 153 of the situation analysis unit 133, the emergency avoidance unit 171 of the action control unit 135, and the like.

The self-position estimation unit 132 performs an estimation process for estimating a position, a posture and the like of the self-car on the basis of data or a signal received from the respective units of the vehicle control system 100, such as the exterior information detection unit 141, and the situation recognition unit 153 of the situation analysis unit 133. Moreover, the self-position estimation unit 132 generates a local map used for estimation of the self-position (hereinafter referred to as self-position estimation map) as necessary. For example, the self-position estimation map is an accurate map using a technology such as SLAM (Simultaneous Localization and Mapping). The self-position estimation unit 132 supplies data indicating a result of the estimation process to the map analysis unit 151, the traffic rule recognition unit 152, and the situation recognition unit 153 of the situation analysis unit 133, and the like. Moreover, the self-position estimation unit 132 stores the self-position estimation map in the storage unit 111.

The self-position estimation unit 132 estimates a self-position by matching between an attribute-attached occupancy grid map (labelled occupancy map) and a pre-map in correspondence with the edge extraction unit 25 and the position estimation unit 26 described above.

The situation analysis unit 133 performs an analysis process for analyzing the self-car and a surrounding situation. The situation analysis unit 133 includes the map analysis unit 151, the traffic rule recognition unit 152, the situation recognition unit 153, and a situation prediction unit 154.

The map analysis unit 151 performs an analysis process for analyzing various maps stored in the storage unit 111 while using data or a signal from the respective units of the vehicle control system 100, such as the self-position estimation unit 132 and the exterior information detection unit 141 as necessary to construct a map including information necessary for the process of autonomous driving. The map analysis unit 151 supplies the constructed map to the traffic rule recognition unit 152, the situation recognition unit 153, the situation prediction unit 154, and a route planning unit 161, a behavior planning unit 162, and an action planning unit 163 of a planning unit 134, and the like.

The traffic rule recognition unit 152 performs a recognition process for recognizing traffic rules around the self-car on the basis of data or a signal received from the respective units of the vehicle control system 100, such as the self-position estimation unit 132, the exterior information detection unit 141, and the map analysis unit 151. For example, a position and a state of a traffic light around the self-car, contents of traffic restrictions around the self-car, lanes where traveling is allowed, and the like are recognized by this recognition process. The traffic rule recognition unit 152 supplies data indicating a result of the recognition process to the situation prediction unit 154 and the like.

The situation recognition unit 153 performs a recognition process for recognizing a situation concerning the self-car on the basis of data or a signal received from the respective units of the vehicle control system 100, such as the self-position estimation unit 132, the exterior information detection unit 141, the interior information detection unit 142, the vehicle state detection unit 143, and the map analysis unit 151. For example, the situation recognition unit 153 performs a recognition process for recognizing a situation of the self-car, a situation around the self-car, a situation of the driver of the self-car, and the like. Moreover, the situation recognition unit 153 generates a local map used for recognizing the situation around the self-car (hereinafter referred to as situation recognition map) as necessary. For example, the situation recognition map is an occupancy grid map.

Examples of the situation of the self-car as a recognition target include a position, a posture, and a motion (e.g., speed, acceleration, and moving direction) of the self-car, presence or absence and contents of abnormality, and the like. Examples of the situation around the self-car as a recognition target include a type and a position of a surrounding still object, a type, a position, and a movement (e.g., speed, acceleration, and moving direction) of a surrounding dynamic object, a configuration of a surrounding road and a state of a road surface, and ambient weather, temperature, humidity, and brightness, and the like. Examples of the state of the driver as a recognition target include a physical condition, an awakening level, a concentration level, a fatigue level, a movement of a visual line, a driving operation, and the like.

The situation recognition unit 153 supplies data indicating a result of the recognition process (including the situation recognition map as necessary) to the self-position estimation unit 132, the situation prediction unit 154, and the like. Moreover, the situation recognition unit 153 stores the situation recognition map in the storage unit 111.

The situation recognition unit 153 generates a labelled occupancy map or determines a danger level in correspondence with the map generation unit 24 and the danger level determination unit 71 described above.

The situation prediction unit 154 performs a prediction process for predicting a situation concerning the self-car on the basis of data or a signal received from the respective units of the vehicle control system 100, such as the map analysis unit 151, the traffic rule recognition unit 152, and the situation recognition unit 153. For example, the situation prediction unit 154 performs a prediction process for predicting a situation of the self-car, a situation around the self-car, a situation of the driver, and the like.

Examples of the situation of the self-car as a prediction target include a conduct of the self-car, occurrence of abnormality, an allowed traveling distance, and the like. Examples of the situation around the self-vehicle as a prediction target include a conduct of a dynamic object around the self-car, a state change of a traffic light, a change of an environment such as a weather, and the like. Examples of the situation of the driver as a prediction target include a conduct and a physical condition of the driver, and the like.

The situation prediction unit 154 supplies data indicating a result of the prediction process to the route planning unit 161, the behavior planning unit 162, and the action planning unit 163 of the planning unit 134, and the like, together with the data received from the traffic rule recognition unit 152 and the situation recognition unit 153.

The route planning unit 161 plans a route to a destination on the basis of data or a signal received from the respective units of the vehicle control system 100, such as the map analysis unit 151, the situation prediction unit 154, and the like. For example, the route planning unit 161 sets a route to a designated destination from a current position on the basis of a global map. Moreover, for example, the route planning unit 161 appropriately changes a route on the basis of a situation of a traffic jam, an accident, a traffic restriction, construction, or the like, a physical condition of the driver, and the like. The route planning unit 161 supplies data indicating a planned route to the behavior planning unit 162 and the like.

The behavior planning unit 162 plans a behavior of the self-car for safe traveling along the route planned by the route planning unit 161 within a planned time on the basis of data or a signal received from the respective units of the vehicle control system 100, such as the map analysis unit 151 and the situation prediction unit 154. For example, the behavior planning unit 162 plans a departure, a stop, a traveling direction (e.g., advancement, retreat, left turn, right turn, and direction change), a traveling lane, a traveling speed, passing, and the like. The behavior planning unit 162 supplies data indicating a planned behavior of the self-car to the action planning unit 163 and the like.

The action planning unit 163 plans an action of the self-car for achieving the behavior planned by the behavior planning unit 162 on the basis of data or a signal received from the respective units of the vehicle control system 100, such as the map analysis unit 151 and the situation prediction unit 154. For example, the action planning unit 163 plans an acceleration, a deceleration, a traveling path, and the like. The action planning unit 163 supplies data indicating the planned action of the self-car to an acceleration/deceleration control unit 172 and a direction control unit 173 of the action control unit 135, and the like.

The action control unit 135 controls an action of the self-car. The action control unit 135 includes the emergency avoidance unit 171, the acceleration/deceleration control unit 172, and the direction control unit 173.

The emergency avoidance unit 171 performs a detection process for detecting an emergency situation, such as collision, contact, entrance into a dangerous zone, abnormality of the driver, and abnormality of the vehicle on the basis of detection results of the exterior information detection unit 141, the interior information detection unit 142, and the vehicle state detection unit 143. The emergency avoidance unit 171 plans an action of the self-car for avoiding an emergency, such as a sudden stop and a sharp turn, in a case where occurrence of an emergency is detected. The emergency avoidance unit 171 supplies data indicating the planned action of the self-car to the acceleration/deceleration control unit 172, the direction control unit 173, and the like.

The acceleration/deceleration control unit 172 performs acceleration/deceleration control for achieving the action of the self-car planned by the action planning unit 163 or the emergency avoidance unit 171. For example, the acceleration/deceleration control unit 172 calculates a control target value of the driving force generator or the braking unit for achieving planned acceleration, deceleration, or sudden stop, and supplies a control command indicating the calculated control target value to the drive control unit 107.

The direction control unit 173 performs direction control for achieving the action of the self-vehicle planned by the action planning unit 163 or the emergency avoidance unit 171. For example, the direction control unit 173 calculates a control target value of a steering mechanism for achieving a traveling path or a sharp turn planned by the action planning unit 163 or the emergency avoidance unit 171, and supplies a control command indicating the calculated control target value to the drive control unit 107.

An accurate self-position of a moving body can be obtained by applying the present technology to the configuration described above.

6. Others

A series of processes described above may be executed by hardware, or may be executed by software. In a case where the series of processes are executed by software, a program constituting the software is installed in a computer. Examples of the computer herein include a computer incorporated in a dedicated hardware, and a general-purpose personal computer or the like capable of executing various functions under various programs installed into the computer.

FIG. 18 is a block diagram depicting a configuration example of hardware of a computer which executes the series of processes described above under a program.

In the computer, a CPU 201, a ROM (Read Only Memory) 202, and a RAM (Random Access Memory) 203 are connected to each other through a bus 204.

An input/output interface 205 is further connected to the bus 204. An input unit 206, an output unit 207, a storage unit 208, a communication unit 209, and a drive 910 are connected to the input/output interface 205.

The input unit 206 includes a keyboard, a mouse, a microphone and the like. The output unit 207 includes a display, a speaker and the like. The storage unit 208 includes a hard disk, a non-volatile memory and the like. The communication unit 209 includes a network interface and the like. The drive 210 drives a removable medium 211 such as a magnetic disk, an optical disk, a magneto-optical disk, and a semiconductor memory.

According to the computer configured as above, the CPU 201 performs the series of processes described above by loading the program stored in the storage unit 208 into the RAM 203 through the input/output interface 205 and the bus 204, and executing the loaded program, for example.

The program executed by the computer (CPU 201) may be recorded and provided in the removable medium 211 as a package medium or the like, for example. In addition, the program may be provided through a wired or wireless transmission medium such as a local area network, the Internet, and digital satellite broadcasting.

In the computer, the program may be installed in the storage unit 208 through the input/output interface 205 with the removable medium 211 attached to the drive 210. Alternatively, the program may be received by the communication unit 209 through a wired or wireless transmission medium, and installed into the storage unit 208. Instead, the program may be installed beforehand into the ROM 202 or the storage unit 208.

Note that the program executed by the computer may be a program where processes are performed in time series in the order described in the present description, or a program where processes are performed in parallel or at necessary timing such as a time when a call is made.

In addition, embodiments of the present technology are not limited to the embodiments described above, but may modified in various manners within a scope without departing from the subject matters of the present technology.

For example, the present technology may have a configuration of cloud computing where one function is shared by a plurality of apparatuses through a network and performed in cooperation with each other.

Moreover, the respective steps described in the flowcharts may be executed by one apparatus, or may be shared and executed by a plurality of apparatuses.

Furthermore, in a case where one step includes a plurality of processes, the plurality of processes included in the one step may be executed by one apparatus, or may be shared and executed by a plurality of apparatuses.

The present technology may also have following configurations.

(1)

An information processing apparatus including:

a map generation unit that generates an attribute-attached occupancy grid map including an existence probability of an obstacle in a space around a moving body for each grid, and an attribute of the obstacle labelled in the occupancy grid map; and a position estimation unit that estimates a position of the moving body by matching in a shape of a non-moving body and the attribute between the attribute-attached occupancy grid map and a pre-map that is the attribute-attached occupancy grid map prepared beforehand.

(2)

The information processing apparatus according to (1), in which the map generation unit generates the attribute-attached occupancy grid map by using depth data in the space, motion data of the moving body, and semantic segmentation data.

(3)

The information processing apparatus according to (2), further including:

an edge extraction unit that generates an edge image containing an edge portion defined between the non-moving body and a free space that does not contain the obstacle, and extracted from the attribute-attached occupancy grid map, in which the position estimation unit estimates the position of the moving body by matching between the edge image and the edge portion of the pre-map.

(4)

The information processing apparatus according to (3), in which the position estimation unit estimates the position of the moving body by filtering position information obtained as a result of the matching on the basis of the motion data of the moving body.

(5)

The information processing apparatus according to (4), in which the position estimation unit estimates the position of the moving body using Kalman filter.

(6)

The information processing apparatus according to any one of (1) to (5), further including:

a route setting unit that sets a moving route of the moving body on the basis of the estimated position of the moving body and a waypoint set for the pre-map.

(7)

The information processing apparatus according to (6), further including:

an action control unit that controls an action of the moving body on the basis of the set moving route of the moving body.

(8)

The information processing apparatus according to (6) or (7), in which the waypoint is registered in the pre-map simultaneously with generation of the pre-map by movement of the moving body beforehand.

(9)

The information processing apparatus according to any one of (6) to (8), further including:

a danger level determination unit that determines and calculates a danger level of the moving body during moving, in which the danger level determination unit sets the danger level at a position where the danger level is calculated in the pre-map.

(10)

The information processing apparatus according to (9), in which the danger level determination unit corrects the waypoint registered in the pre-map on the basis of a degree of the danger level set for the pre-map.

(11)

An information processing method including:

by an information processing apparatus, generating an attribute-attached occupancy grid map including an existence probability of an obstacle in a space around a moving body for each grid, and an attribute of the obstacle labelled in the occupancy grid map; and estimating a position of the moving body by matching in a shape of a non-moving body and the attribute between the attribute-attached occupancy grid map and a pre-map that is the attribute-attached occupancy grid map prepared beforehand.

(12)

A program that causes a computer to execute processes of:

generating an attribute-attached occupancy grid map including an existence probability of an obstacle in a space around a moving body for each grid, and an attribute of the obstacle labelled in the occupancy grid map; and estimating a position of the moving body by matching in a shape of a non-moving body and the attribute between the attribute-attached occupancy grid map and a pre-map that is the attribute-attached occupancy grid map prepared beforehand.

REFERENCE SIGNS LIST

10 Vehicle controller, 11 Camera, 12 LiDAR, 21 Depth data generation unit, 22 Semantic segmentation unit, 23 Visual odometry unit, 24 Map generation unit, 25 Edge extraction unit, 26 Position estimation unit, 27 Pre-map storage unit, 60 Vehicle controller, 61 Route setting unit, 62 Action control unit, 70 Vehicle controller, 71 Danger level determination unit

The invention claimed is:

1. An information processing apparatus, comprising:
a storage device; and
a central processing unit (CPU) configured to:
receive an image associated with a moving body from a first sensor;
receive, from a second sensor, distance information indicating a distance of the moving body to an obstacle in a space around the moving body;
generate depth data based on the received image and the distance information;
generate, based on the received image, motion data of the moving body and semantic segmentation data;
generate a first attribute-attached occupancy grid map;
control storage of the first attribute-attached occupancy grid map in the storage device,
wherein the first attribute-attached occupancy grid map includes a first edge portion between the obstacle and a free space that does not include the obstacle;
generate a second attribute-attached occupancy grid map that includes:
an existence probability of the obstacle in the space around the moving body for each grid of a plurality of grids; and
an attribute of the obstacle labelled,
wherein the generation of the second attribute-attached occupancy grid map is based on the depth data, the motion data, and the semantic segmentation data;
extract, from the generated second attribute-attached occupancy grid map, a second edge portion between the obstacle and the free space that does not include the obstacle;
generate an edge image that includes the second edge portion; and
estimate a first position of the moving body by matching between the edge image and the first edge portion of the first attribute-attached occupancy grid map.

2. The information processing apparatus according to claim 1, wherein
the CPU is further configured to:
acquire position information based on a result of the matching between the edge image and the first edge portion of the first attribute-attached occupancy grid map;
filter the position information based on the motion data of the moving body; and
estimate the first position of the moving body based on the filtered position information.

3. The information processing apparatus according to claim 2, wherein the CPU is further configured to estimate the first position of the moving body based on a Kalman filter.

4. The information processing apparatus according to claim 1, wherein the CPU is further configured to:
set a waypoint in the first attribute-attached occupancy grid map; and
set a moving route of the moving body, based on the estimated first position of the moving body and the set waypoint.

5. The information processing apparatus according to claim 4, wherein the CPU is further configured to control an action of the moving body based on the set moving route of the moving body.

6. The information processing apparatus according to claim 4, wherein the CPU is further configured to register the waypoint in the first attribute-attached occupancy grid map concurrently with the generation of the first attribute-attached occupancy grid map.

7. The information processing apparatus according to claim 4, wherein the CPU is further configured to:

calculate a danger level of the moving body during movement; and set the calculated danger level at a second position, where the danger level is calculated in the first attribute-attached occupancy grid map.

8. The information processing apparatus according to claim 7, wherein the CPU is further configured to correct the set waypoint in the first attribute-attached occupancy grid map based on the set calculated danger level in the first attribute-attached occupancy grid map.

9. An information processing method, comprising:

receiving an image associated with a moving body from a first sensor;

receiving, from a second sensor, distance information indicating a distance of the moving body to an obstacle in a space around the moving body;

generating depth data based on the received image and the distance information;

generating, based on the received image, motion data of the moving body and semantic segmentation data;

generating a first attribute-attached occupancy grid map;

storing the first attribute-attached occupancy grid map in a storage device, wherein the first attribute-attached occupancy grid map includes a first edge portion between the obstacle and a free space that does not include the obstacle;

generating a second attribute-attached occupancy grid map that includes:

an existence probability of the obstacle in the space around the moving body for each grid of a plurality of grids; and an attribute of the obstacle labelled, wherein the generation of the second attribute-attached occupancy grid map is based on the depth data, the motion data, and the semantic segmentation data;

extracting, from the generated second attribute-attached occupancy grid map, a second edge portion between the obstacle and the free space that does not include the obstacle;

generating an edge image that includes the second edge portion; and estimating a position of the moving body by matching between the edge image and the first edge portion of the first attribute-attached occupancy grid map.

10. A non-transitory computer-readable medium having stored thereon computer-executable instructions which, when executed by a processor, cause the processor to execute operations, the operations comprising:

receiving an image associated with a moving body from a first sensor;

receiving, from a second sensor, distance information indicating a distance of the moving body to an obstacle in a space around the moving body;

generating depth data based on the received image and the distance information;

generating, based on the received image, motion data of the moving body and semantic segmentation data;

generating a first attribute-attached occupancy grid map;

storing the first attribute-attached occupancy grid map in a storage device, wherein the first attribute-attached occupancy grid map includes a first edge portion between the obstacle and a free space that does not include the obstacle;

generating a second attribute-attached occupancy grid map that includes:

an existence probability of the obstacle in the space around the moving body for each grid of a plurality of grids; and an attribute of the obstacle labelled, wherein the generation of the second attribute-attached occupancy grid map is based on the depth data, the motion data, and the semantic segmentation data;

extracting, from the generated second attribute-attached occupancy grid map, a second edge portion between the obstacle and the free space that does not include the obstacle;

generating an edge image that includes the second edge portion; and estimating a position of the moving body by matching between the edge image and the first edge portion of the first attribute-attached occupancy grid map.

* * * * *